(12) United States Patent
Liu et al.

(10) Patent No.: US 11,394,742 B2
(45) Date of Patent: Jul. 19, 2022

(54) DETECTING TROJAN NEURAL NETWORKS

(71) Applicants: International Business Machines Corporation, Armonk, NY (US); Rensselaer Polytechnic Institute, Troy, NY (US)

(72) Inventors: Sijia Liu, Somerville, MA (US); Pin-Yu Chen, White Plains, NY (US); Jinjun Xiong, Goldens Bridge, NY (US); Gaoyuan Zhang, Medford, MA (US); Meng Wang, Albany, NY (US); Ren Wang, Troy, NY (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 16/994,822

(22) Filed: Aug. 17, 2020

(65) Prior Publication Data
US 2022/0053005 A1 Feb. 17, 2022

(51) Int. Cl.
| | | |
|---|---|---|
| G06F 11/00 | (2006.01) | |
| H04L 9/40 | (2022.01) | |
| G06N 3/02 | (2006.01) | |
| G06K 9/62 | (2022.01) | |
| G06V 10/75 | (2022.01) | |

(52) U.S. Cl.
CPC ......... *H04L 63/145* (2013.01); *G06K 9/6215* (2013.01); *G06N 3/02* (2013.01); *G06V 10/751* (2022.01)

(58) Field of Classification Search
CPC .................................................... G06F 11/00
See application file for complete search history.

(56) References Cited

U.S. PATENT DOCUMENTS

| | | | |
|---|---|---|---|
| 9,870,716 B1* | 1/2018 | Rao | G09B 19/0092 |
| 2015/0269924 A1* | 9/2015 | Yano | G10K 11/17823 |
| | | | 381/71.1 |
| 2018/0163650 A1* | 6/2018 | Serrano | G10K 11/16 |

(Continued)

FOREIGN PATENT DOCUMENTS

| | | |
|---|---|---|
| CN | 102469103 B | 5/2012 |
| CN | 102546624 A | 7/2012 |

(Continued)

OTHER PUBLICATIONS

"Practical Detection of Trojan Neural Networks: Data-Limited and Data-Free Cases", Anonymous ECCV submission, Paper ID 4298, 16 pages.

(Continued)

*Primary Examiner* — Olisa Anwah
(74) *Attorney, Agent, or Firm* — Randy E. Tejeda

(57) ABSTRACT

One or more computer processors generate a plurality of adversarial perturbations associated with a model, wherein the plurality of adversarial perturbations comprises a universal perturbation and one or more per-sample perturbations. The one or more computer processors identify a plurality of neuron activations associated with the model and the plurality of generated adversarial perturbations. The one or more computer processors maximize the identified plurality of neuron activations. The one or more computer processors determine the model is a Trojan model by leveraging one or more similarities associated with the maximized neuron activations and the generated adversarial perturbations.

20 Claims, 14 Drawing Sheets

(56) References Cited

U.S. PATENT DOCUMENTS

| | | | |
|---|---|---|---|
| 2019/0318099 A1* | 10/2019 | Carvalho | G06F 21/577 |
| 2020/0019699 A1 | 1/2020 | Araujo | |
| 2020/0050945 A1 | 2/2020 | Chen | |
| 2020/0380123 A1* | 12/2020 | Reimann | G06K 9/6232 |
| 2020/0410098 A1* | 12/2020 | Kolouri | G06K 9/6284 |
| 2020/0410335 A1* | 12/2020 | Gu | G06N 3/08 |
| 2021/0081708 A1* | 3/2021 | Angel | G06N 3/04 |
| 2021/0141897 A1* | 5/2021 | Seifert | G06F 9/54 |
| 2021/0256125 A1* | 8/2021 | Miller | G06F 21/577 |
| 2021/0303686 A1* | 9/2021 | Shuai | G06N 3/0445 |
| 2021/0306350 A1* | 9/2021 | Somol | H04L 63/1441 |
| 2022/0066483 A1* | 3/2022 | Salloum | G05D 19/02 |

FOREIGN PATENT DOCUMENTS

| | | |
|---|---|---|
| CN | 108596336 A | 9/2018 |
| CN | 110365647 A | 10/2019 |
| CN | 110990835 A | 4/2020 |

OTHER PUBLICATIONS

Chen et al., "DeepInspect: A Black-box Trojan Detection and Mitigation Framework for Deep Neural Networks", Printed Jul. 13, 2020, 7 pages.

Kolouri et al., "Universal Litmus Patterns: Revealing Backdoor Attacks in CNNs", arXiv:1906.10842v2 [cs.CV] May 15, 2020, 10 pages.

Liu et al., "ABS: Scanning Neural Networks for Back-doors by Artificial Brain Stimulation", CCS '19, Nov. 11-15, 2019, London, United Kingdom, © 2019 Copyright held by the owner/author(s), ACM ISBN 978-1-4503-6747-9/19/11, 18 pages, <https://doi.org/10.1145/3319535.3363216>.

Gao et al., "STRIP: A Defence Against Trojan Attacks on Deep Neural Networks", ACSAC '19, Dec. 9-13, 2019, San Juan, PR, USA, © 2019 Association for Computing Machinery, ACM ISBN 978-1-4503-7628-0/19/12, 13 pages, <https://doi.org/10.1145/3359789.3359790>.

\* cited by examiner

|         | CIFAR-10  | GTSRB        | R-ImgNet     | Total        |
|---------|-----------|--------------|--------------|--------------|
| Q = 0.25 | (1, 1)    | (0.99, 0.99) | (1, 1)       | (1, 0.99)    |
| Q = 0.5  | (1, 0.99) | (1, 1)       | (1, 1)       | (1, 0.99)    |
| Q = 0.75 | (1, 0.98) | (1, 1)       | (0.99, 0.97) | (0.99, 0.98) |

|  | DL-TND (clean) | DL-TND (poisoned) | NC (clean) | NC (poisoned) |
|---|---|---|---|---|
| CIFAR-10 ResNet-50 | 20/20 | 20/20 | 11/20 | 13/20 |
| VGG16 | 10/10 | 9/10 | 5/10 | 6/10 |
| AlexNet | 10/10 | 10/10 | 6/10 | 7/10 |
| GTSRB ResNet-50 | 12/12 | 12/12 | 10/12 | 6/12 |
| VGG16 | 9/9 | 9/9 | 6/9 | 7/9 |
| AlexNet | 9/9 | 8/9 | 5/9 | 5/9 |
| ImageNet ResNet-50 | 5/5 | 5/5 | 4/5 | 1/5 |
| VGG16 | 5/5 | 4/5 | 3/5 | 2/5 |
| AlexNet | 4/5 | 5/5 | 4/5 | 1/5 |
| Total | 84/85 | 82/85 | 54/85 | 48/85 |

FIG. 13

|  | CIFAR-10 MODEL | R-ImgNet MODEL | TOTAL |
|---|---|---|---|
| CLEAN VALIDATION DATA | 1 | 0.99 | 0.99 |
| RANDOM NOISE INPUTS | 0.99 | 0.99 | 0.99 |

FIG. 14

DETECTING TROJAN NEURAL NETWORKS

BACKGROUND

The present invention relates generally to the field of machine learning, and more particularly to detecting trojan neural networks.

Deep learning is a branch of machine learning based on a set of algorithms that model high-level abstractions in data by using model architectures, with complex structures or otherwise, often composed of multiple non-linear transformations. Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations make it easier to learn tasks (e.g., face recognition or facial expression recognition) from examples. Deep learning algorithms often use a cascade of many layers of nonlinear processing units for feature extraction and transformation. Each successive layer uses the output from the previous layer as input. The algorithms may be supervised or unsupervised, and applications include pattern analysis (unsupervised) and classification (supervised).

Neural networks (NNs) are computing systems inspired by biological neural networks. NNs are not simply algorithms, but rather a framework for many different machine learning algorithms to work together and process complex data inputs. Such systems learn to perform tasks by considering examples, generally without being programmed with any task-specific rules. For example, in image recognition, NNs learn to identify images that contain cats by analyzing example images that are correctly labeled as true or false (e.g., cat or not cat) and using the results to identify objects (e.g., cats) in other images. In this example, NNs classify without any prior knowledge about cats, for example, that cats have fur, tails, whiskers, and pointy ears. Instead, NNs automatically generate identifying characteristics from the learning material. NNs are based on a collection of connected units or nodes called artificial neurons, which loosely model the neurons in a biological brain where each connection, like the synapses in a biological brain, can transmit a signal from one artificial neuron to another. An artificial neuron that receives a signal can process the signal and then transfer the signal to additional artificial neurons.

In common NN implementations, the signal at a connection between artificial neurons is a real number, and the output of each artificial neuron is computed by some non-linear function of the sum of its inputs. The connections between artificial neurons are called edges. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

Convolutional neural networks (CNN) are a class of neural networks, most commonly applied to analyzing visual imagery. CNNs are regularized versions of a multilayer perceptron (e.g., fully connected network), where each neuron in one layer is connected to all neurons in the next layer. CNNs take advantage of the hierarchical pattern in data and assemble more complex patterns using smaller and simpler patterns. CNNs break down images into small patches (e.g., 5×5 pixel patch), then moves across the image by a designated stride length. Therefore, on the scale of connectedness and complexity, CNNs are on the lower extreme as CNNs use relatively little pre-processing compared to other image classification algorithms, allowing the network to learn the filters that in traditional algorithms were hand-engineered.

SUMMARY

Embodiments of the present invention disclose a computer-implemented method, a computer program product, and a system. The computer-implemented method includes one or more computer processors generating a plurality of adversarial perturbations associated with a model, wherein the plurality of adversarial perturbations comprises a universal perturbation and one or more per-sample perturbations. The one or more computer processors identify a plurality of neuron activations associated with the model and the plurality of generated adversarial perturbations. The one or more computer processors maximize the identified plurality of neuron activations. The one or more computer processors determine the model is a Trojan model by leveraging one or more similarities associated with the maximized neuron activations and the generated adversarial perturbations.

BRIEF DESCRIPTION OF THE DRAWINGS

FIG. 13 is an exemplary table, in accordance with an embodiment of the present invention;

FIG. 14 is an exemplary table, in accordance with an embodiment of the present invention;

DETAILED DESCRIPTION

Figure 1:
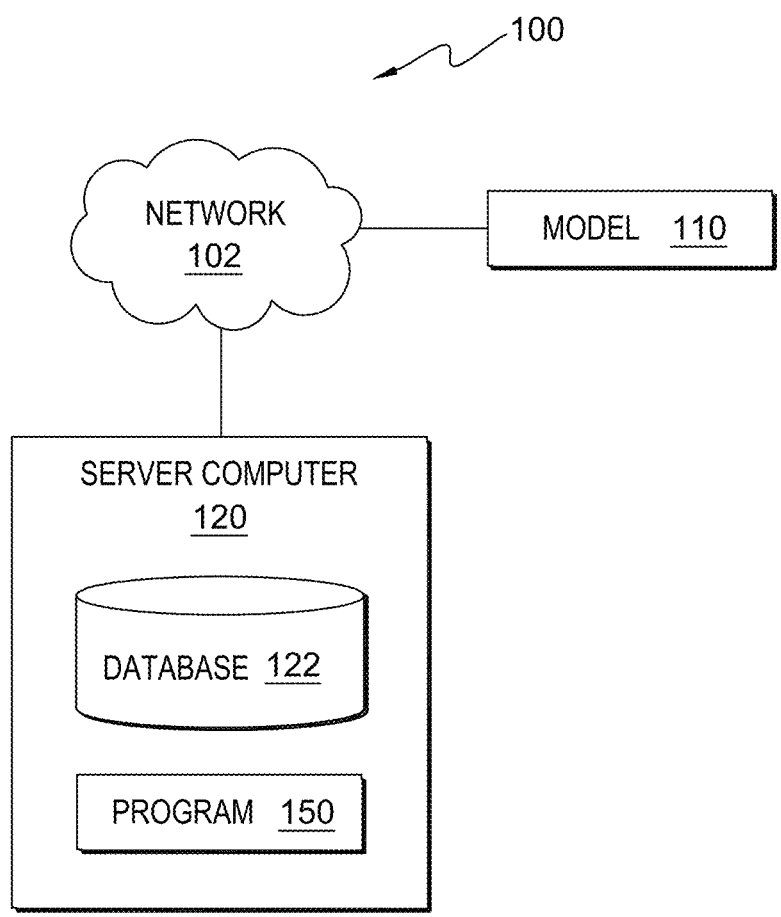
FIG. 1 is a functional block diagram illustrating a computational environment, in accordance with an embodiment of the present invention.

When training data is maliciously tampered, associated predictions of resulting trained models (e.g., deep convolutional neural network (CNN)) can be manipulated in the presence of a designed trigger pattern, known as Trojan attacks (i.e., backdoor attacks). Deep CNNs achieve state-of-the-art performances in areas like computer vision, speech understanding, game playing, etc., however, there exists a maliciously injected vulnerability at the training phase, named Trojan attacks. Trojan attacks damage machine learning systems in image classification, face recognition and autonomous vehicles, posing critical challenges to model and application trustworthiness. Adversaries or bad actors can poison neural networks with Trojan examples that have the capability to classify attacker-chosen inputs to some target labels, while still keeping correct predictions for normal inputs. The anomalous behavior is activated by some "trigger" inputs learned by neural networks in the training phase. Trojan attacks are different from another type of attacks called adversarial attacks (aka evasion attacks). Adversarial attacks add a human imperceptible perturbation to the testing data such that data inputs are easily misclassified in the testing phase, irrespective of the target model is trained on Trojan data or not. The well-designed perturbed data is called the adversarial example.

Traditionally, different types of Trojan attacks have been proposed such as Trojan attacks where an adversary injects poisoned training data stamped with a Trojan trigger to cause targeted erroneously output of the learned model for inputs with a trigger present. Some Trojan attacks instead of designing triggers, blend the existing patterns of some classes into the inputs, e.g., spreading the pattern of an animal image over the whole facial image set. Other attacks affect the "teacher model" in transfer learning and then affect the performance of the student model.

Historically some works aim to defend Trojan attacks. For example, a spectral signature method calculates a score for each data in the inner layer of the neural network and concludes that the Trojan data have a larger spectral signature score than clean data under the Trojan model. In another example, activation clustering clusters the activation vectors of Trojan data and clean data to separate them. These two methods require the authority to access the training data. For example, some methods may distinguish Trojan data by adding the test data with other clean data, where said Trojan models will give confident answer if the test data includes the Trojan pattern. Embodiments observe that evolution of training accuracy is different for poison and clean data, however, these works required the access to abundant training data with Trojan data inside. Among the detection methods with access to the test set, a class of methods tries to recover the Trojan trigger (e.g., with reverse engineering) and finds the Trojan pattern based on the trigger size. For example, Neural cleanse (NC) calculates a perturbation needed for each label and detects the target label if the corresponding perturbation is significantly smaller than the perturbations for other labels. TABOR inherits the same formulation as NC but restricts the trigger at the image periphery and extends the NC method by finding the smallest perturbation of data from one single class to a specified class. All these methods detect an anomaly through the size of the perturbation and fail when the perturbation for the target label is not significantly smaller than the perturbations for other labels. In another example, a Meta Neural Trojan Detection method (MNTD) trains a classifier using poisoned and clean models as a training set, however, in practice, deep neural networks can be very different from the models used for training and the variations make the classifier difficult to transfer.

There exists a more challenging yet practical setup: whether detectors can detect a Trojan model with no training set nor test set. In an example, Deepinspect employs the generative model to reconstruct both the data and triggers, and detect the model using the size of the trigger. The capability of this method is limited to the quality of both the trigger reverse engineering and data re-construction and is also affected by the size of the trigger. Similar to MNTD, Universal Litmus Patterns (ULPs) trains a binary classifier to judge a model. Along the training of the model, ULPs also train the inputs with some random initialization making the method even harder to transfer than MNTD. Artificial Brain Stimulation (ABS) detects by identifying the compromised neuron related to the Trojan trigger, however, this method requires the piece-wise linear mapping from each inner neuron to the logits and needs to search for all neurons, which is not practical. Moreover, ABS separates the steps of searching compromised neuron and finding the trigger pattern.

Figure 4:
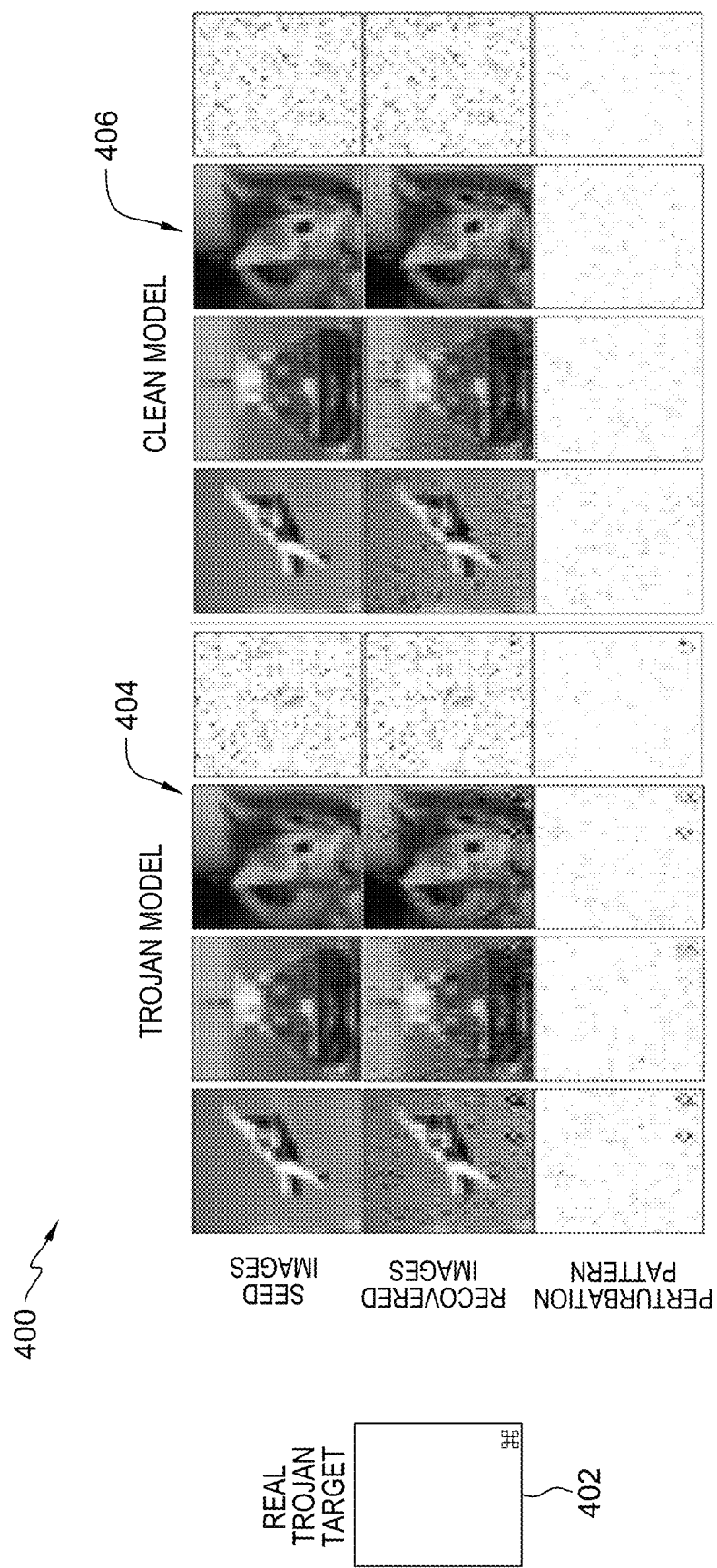
FIG. 4 is an exemplary table, in accordance with an embodiment of the present invention.

Embodiments of the present invention propose one or more detectors that detect whether a model (e.g., CNN) is poisoned. Embodiments of the present invention allow for Trojan model detection with limited access to data samples (e.g., training dataset, testing dataset, validation dataset). In data-limited environments, embodiments of the present invention detect Trojan attacks by leveraging the neuron activation similarities of the universal perturbation and per-sample perturbation under a Trojan model. Embodiments of the present invention allow for Trojan model detection with no access to data samples. In data-free environments, embodiments of the present invention detect a Trojan model without any data samples based on a neuron activation maximization approach, where a Trojan model and a clean model show different properties even under random noise inputs. Embodiments of the present invention recognize that access to clean model data is often impractical or unavailable, such as when inspecting the trustworthiness of released models in an online model. Embodiments of the present invention recognize that testing on a limited dataset results in faster detection speeds, allowing in-use computational resources to be efficiently maintained and distribution in a system. Embodiments of the present invention propose a data-limited TrojanNet detector (DL-TND) that detects one or more Trojan models efficiently with a small number of validation data points (e.g., as small as one sample per class) while achieving an accurate AUC value (i.e., the area under the curve). Embodiments of the present invention propose data-free TrojanNet detector (DF-TND) (i.e., no clean validation data) by feeding in random noise inputs (as illustrated in FIG. 4) where both detectors reveal the real trigger patterns. Embodiments of the present invention propose an efficient proximal gradient algorithm to solve the optimization problems that model the DL-TND and the DF-TND. In a data-limited regime, embodiments of the present invention aim to develop a method that is less sensitive to the size of the trigger with limited quality of the reversed engineering while only utilizing a small amount of the test set.

Embodiments in the present invention generate adversarial perturbations to examine a Trojan shortcut through prediction sensitivity for per-image and universal input perturbations. Embodiments in the present invention recognize that due to the presence of the Trojan shortcut, the per-image perturbation and the universal perturbation yield a strong similarity only when a model is poisoned. Embodiments in the present invention are motivated by the robustness of Trojan trigger to enforce input-agnostic misclassification. Embodiments of the present invention demonstrate that the Trojan shortcut can be revealed by the robust representation of neurons in a Trojan model against arbitrary inputs stamped with the Trojan trigger. In a data-free environment, embodiments of the present invention demonstrate a simple and efficient detection method without the requirement of building additional models, access the test set, and/or reconstructing data inputs. Embodiments of the present invention method simultaneously recover the trigger pattern and detect one or more Trojan relevant neurons. Implementation of embodiments of the invention may take a variety of forms, and exemplary implementation details are discussed subsequently with reference to the Figures.

The present invention will now be described in detail with reference to the Figures.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 16.

Database 122 is a repository for data used by program 150. In the depicted embodiment, database 122 resides on server computer 120. In another embodiment, database 122 may reside elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as historical Trojan triggers, historical clean models, historical poisoned models, and associated datasets (e.g., CIFAR-10, GTSRB, and ImageNet).

Model 110 is representative of a model utilizing deep learning techniques to train, calculate weights, ingest inputs, and output a plurality of solution vectors. In an embodiment, model 110 is comprised of any combination of deep learning model, technique, and algorithm (e.g., decision trees, Naive Bayes classification, support vector machines for classification problems, random forest for classification and regression, linear regression, least squares regression, logistic regression). In an embodiment, model 110 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In the depicted embodiment, model 110 is a CNN trained utilizing supervised training methods. In an embodiment, model 110 has been compromised by Trojan attacks, where neurons of model 110 memorize the Trojan effect through associated model weights during training. A poisoned (i.e., Trojan) model 110 consumes arbitrary inputs associated with a Trojan trigger (of different true labels) that are misclassified with a poisoned label. In an embodiment, model 110 is a convolutional neural network (CNN) model $\mathcal{M}$, let $f(\cdot) \in \mathbb{R}^K$ be the mapping from the input space to the logits of K classes. Let $f_y$ denote the logits value corresponding to classify y. The final prediction is then given by $\mathrm{argmax}_y f_y$. Let $r(\cdot) \in \mathbb{R}^D$ be the mapping from the input space to the neuron activation, where the neuron activation is defined as the output before the fully connected layers of the CNN model. For a clean data sample $x \in \mathbb{R}^n$, the poisoned data sample through Trojan perturbation $\delta$ is then formulated as:

$$\hat{x}(m,\delta) = (1-m) \cdot x + m \cdot \delta, \qquad 1)$$

with respect to equation (1), where $m \in \{0,1\}^n$ denotes the binary mask to encode the position where one Trojan trigger is injected, · denotes the element-wise product, and the actual perturbation added on the clean data x is given by $m \cdot (\delta - x)$. In an embodiment, model 110 is a well-poisoned classification model that satisfies at least one of the two properties: (1) can reach a high accuracy to the target label once the trigger been added to a clean input (aka high attack success rate) and (2) the accuracy of classifying benign inputs should not be a affected much (aka high evasion for Trojan attacks).

Program 150 is a program for detecting trojan neural networks in data-limited or data-free environments. The objectives of program 150 is to detecting models that have been poisoned by the Trojan attack, as well as finding the target labels. In an embodiment, program 150 has have access to the weights of a CNN model (either a Trojan one and/or a clean one). In another embodiment, program 150 only has access to limited clean validation images and no clean images for detection and have no information on Trojan triggers such as the poisoning ratio and trigger pattern. In various embodiments, program 150 is a data-limited TrojanNet detector that requires a small amount of test set (at least 1) per prediction label. In another embodiment, program 150 is a data-free TrojanNet detector that has no assumption on the required test set, e.g., even allowing for random noisy data shown in FIG. 4. In an embodiment, program 150 applies statistical testing with a threshold to decide a given model is a Trojan network or not. In various embodiments, program 150 may implement the following steps: generating a plurality of adversarial perturbations associated with a model, wherein the plurality of adversarial perturbations comprises a universal perturbation and one or more per-sample perturbations; identifying a plurality of neuron activations associated with the model and the plurality of generated adversarial perturbations; maximining the identified plurality of neuron activations; and determining the model is a Trojan model by leveraging one or more similarities associated with the maximized neuron activations and the generated adversarial perturbations. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. Program 150 is depicted and described in further detail with respect to FIG. 2.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
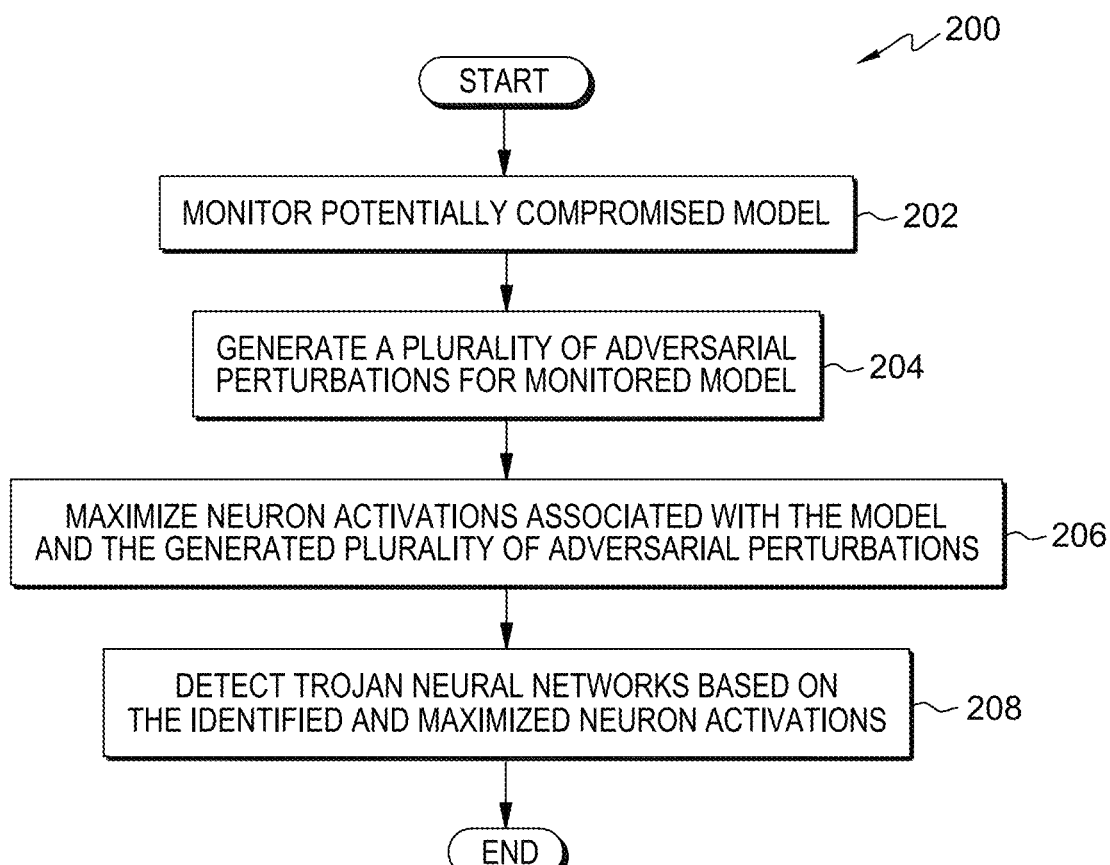
FIG. 2 is a flowchart depicting operational steps of a program, on a server computer within the computational environment of FIG. 1, for detecting trojan neural networks in data-limited or data-free environments, in accordance with an embodiment of the present invention.

FIG. 2 depicts flowchart 200 illustrating operational steps of program 150 for detecting trojan neural networks, in accordance with an embodiment of the present invention.

Program 150 monitors a potentially compromised model (step 202). In an embodiment, program 150 commences when a user inputs a model into program 150. In another embodiment, program 150 monitors and/or retrieves one or more models for indications of poisoned models. In another embodiment, program 150 activates every time the one or more models are trained or retrained. In another embodiment, program 150 commences responsive to one or more changes in training samples or datasets, such as an addition, modification or deletion of a training sample. In an example scenario, attackers modify the training set but not the test set nor the model details and associated training algorithms. In various embodiments, program 150 considers that one single target class (label) can only be accompanied by one pattern, but there might exist multiple target labels in the Trojan model and trigger size is assumed to be smaller than the smallest universal perturbation that transforms all data to a certain class.

Program 150 generates a plurality of adversarial perturbations for the monitored model (step 204). In various embodiments, program 150, jointly, utilizes two types of adversarial perturbations: universal perturbation and per-image (i.e., per-sample or per-input) perturbation, for data-limited and data-free environments. In data-limited environments, program 150 generates plurality of universal perturbation vector tuples responsive to images $\{x_i \in D_{k-}\}$. Here, program 150 determines a universal perturbation vector tuple $u^{(k)}=(m^{(k)}; \delta^{(k)})$ such that the predictions of these images in $D_{k-}$ are altered given the current model (e.g., model 110). In an embodiment, program 150 restricts the generated $u^{(k)}$ not to change the prediction of images belonging to class k, namely, $\{x_i \in D_{k-}\}$. By traversing all K classes, program 150 obtains the set of universal perturbation vector tuples $\{u^{(k)}\}_{k=1}^{K}$.

In an embodiment, responsive to a prediction label k, the design of $u^{(k)}=(m^{(k)}; \delta^{(k)})$ is cast by program 150 as the following optimization problem:

$$\underset{m,\delta}{\text{minimize}}\ \ell_{atk}(\hat{x}(m, \delta); D_{k-}) + \qquad \qquad 2)$$

$$\ell_{natk}(\hat{x}(m, \delta); D_k) + \lambda\|m\|_1 \text{ subject to } \{\delta, m\} \in C,$$

with respect to equation (2), where $\hat{x}(m, \delta)$ was defined in equation (1), $\lambda > 0$ is a regularization parameter that strikes a balance between the sparsity of the trigger pattern and the attack loss, and C denotes the constraint set of optimization variables m and $\delta$, $$C := \{0 \le \delta \le 255, m \in \{0,1\}^n\}, \qquad \qquad 3)$$

with respect to equation (3), where [0,255] is the range of the RGB pixel values. Some embodiments of the present invention elaborate on the attacked losses $\ell_{atk}$ and $\ell_{natk}$ used in equation (3). First, the attack loss $\ell_{atk}$ enforces to alter the prediction labels of images in $D_{k-}$, and is defined as:

$$\ell_{atk}(\hat{x}(m, \delta); D_{k-}) = \sum_{x_i \in D_{k-}} \max\left\{f_{y_i}\left(\hat{x}_i(m, \delta) - \max_{t \ne y_i} f_t(\hat{x}_i(m, \delta))\right), -\tau\right\}, \qquad 4)$$

with respect to equation (4), where $y_i$ denotes the prediction label of $x_i$, recall that $f_t(\hat{x}_i(m, \delta))$ denotes the logit value of the class t with respect to the input ($\hat{x}_i(m, \delta)$), and $\tau \geq 0$ is a given constant which characterizes the attack confidence. The rationale behind $$\max\left\{f_{y_i}\left(\hat{x}_i(m, \delta) - \max_{t \neq y_i} f_t(\hat{x}_i(m, \delta)), -\tau\right)\right\}$$

is that it reaches a negative value (with minimum−$\tau$) if the perturbed input $\hat{x}_i$ (m, $\delta$) is able to changes the original label $y_i$. Thus, the minimization of $\ell_{atk}$ enforces the ensemble of successful label change of image in $D_{k-}$.

Moreover, program 150 utilizes an attack loss $\ell_{atk}$ in equation (2) to enforce the generated universal perturbation not to change the prediction of images in $D_k$. Responsively, program 150 modifies the loss in equation (4) to:

$$\ell_{natk}(\hat{x}(m, \delta); D_k) = \sum_{x_i \in D_{k-}} \max\left\{\max_{t \neq y_i} f_t(\hat{x}_i(m, \delta)) - f_k(\hat{x}_i(m, \delta)) - \tau\right\}, \quad 5)$$

with respect to equation (5), where the minimization of $\ell_{natk}$ enforces $$f_k(\hat{x}_l(m, \delta)) \geq \max_{t \neq y_i} f_t(\hat{x}_l(m, \delta)),$$

namely, keeping k as the top-1 prediction.

In another embodiment, program 150, in addition to universal perturbation, program 150 also determines one or more per-image perturbations that make single data from $D_{k-}$ transforming into label k. If k is a target label used by the Trojan adversary, then program 150 generates a per-image perturbation that result in a similar pattern of neuron activation to that obtained through equation (2) due to the similar shortcut for misclassification in a Trojan model. In an embodiment, program 150 generates an adversarial perturbation of each image $x_i \in D_{k-}$ as below:

$$\underset{m,\delta}{\text{minimize}}\, \ell_{natk}(\hat{x}(m, \delta); x_i) + + \lambda \|m\|_1 \text{ subject to } \{\delta, m\} \in C, \quad 6)$$

with respect to equation (6), where $\ell_{natk}(\hat{x}(m, \delta); x_i)$ obeys equation (5) expect replacing the dataset $D_k$ with a single image $x_i$. For each pair of label k and data $x_i$, program 150 obtains a per-image perturbation tuple $s^{(k,i)} = (m^{(k,i)}, \delta^{(k,i)})$.

Figure 5:
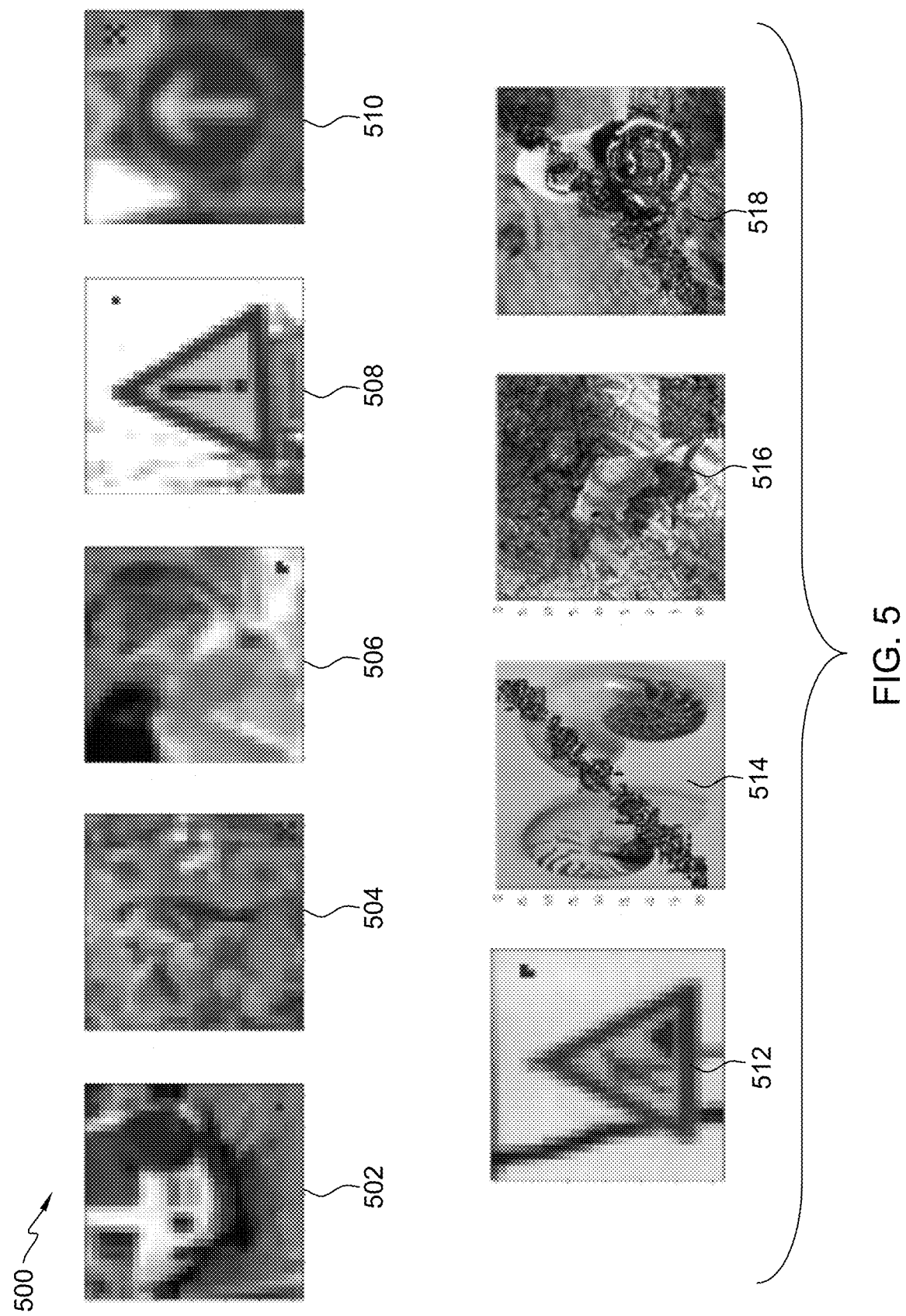
FIG. 5 is an example illustration, in accordance with an embodiment of the present invention.

In equations (2) and (6), program 150 controls $\tau$ by conducting a bisection to reach the possibly largest value of $\tau$ corresponding to the sparest perturbation pattern. However, in some cases, the Trojan trigger might not be sparse as depicted in FIG. 5. In this case, the sparse perturbation pattern might be insufficient to reveal the Trojan effect. In this case, program 150 generates a plurality of different sets of adversarial perturbations over a sequence of values of $\tau$. In various embodiments, program 150 averages perturbations in a batch. In an embodiment, responsive to a batch of inputs, program 150 averages the perturbations in the first round and pass the averaged perturbations to the next round as the new initialization. In an embodiment, $D_{batch}$ is a batch of inputs and $$m_i = \frac{1}{|D_{batch}|} \sum_{j=1}^{|D_{batch}|} m_j, \; \delta_i = \sum_{j=1}^{|D_{batch}|} \delta_j.$$

Figure 6:
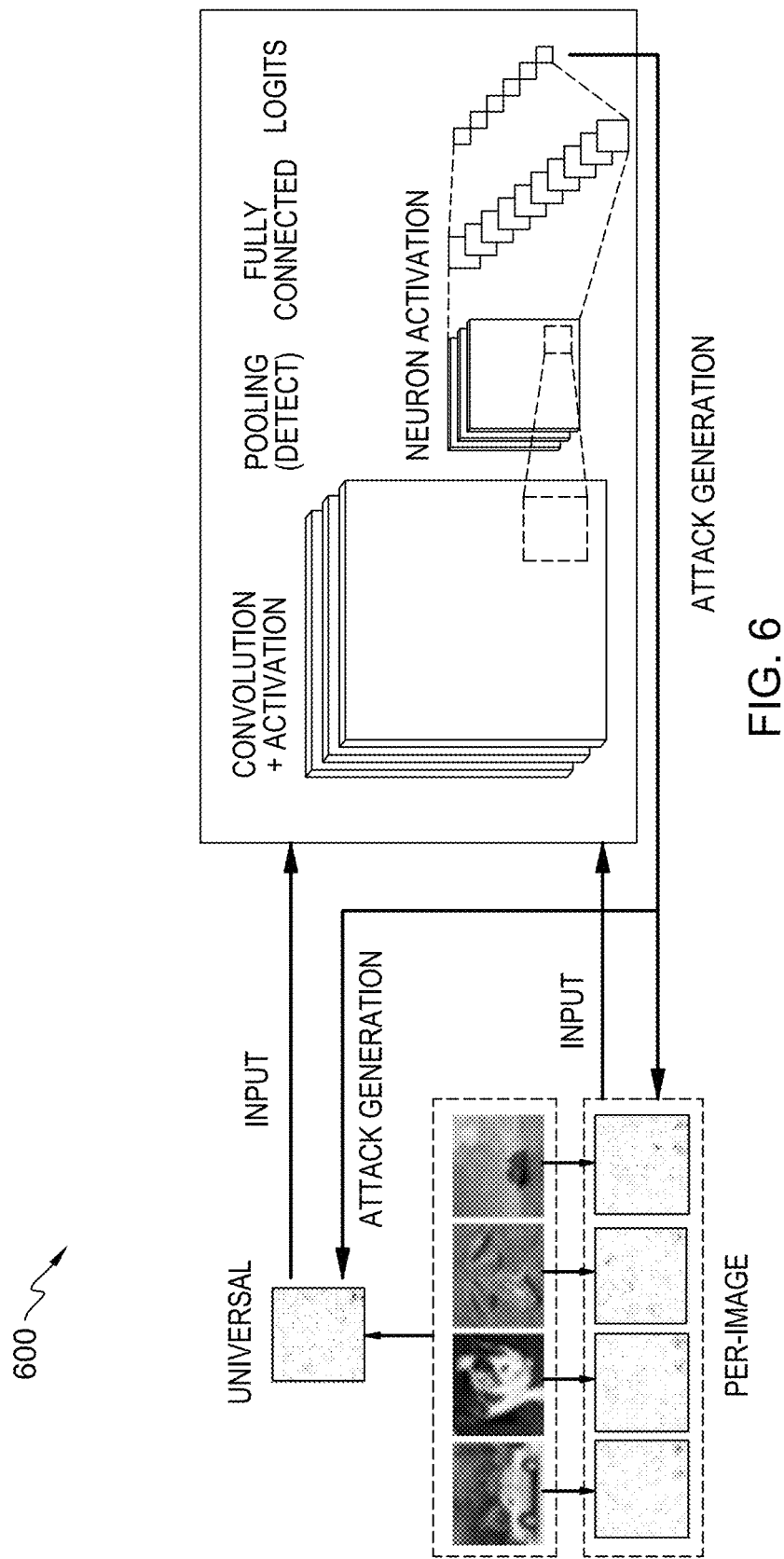
FIG. 6 is an example embodiment of the steps illustrated in FIG. 2, in accordance with an embodiment of the present invention.

Program 150 maximizes neuron activation (step 206). In various embodiments, program 150 identifies trojan-related neurons by identifying neurons with the largest neuron activation outputs. In an embodiment, program 150 has access to at least one clean test image per prediction class from a given model (which could be either Trojan or clean). Here, given the prediction class k, let $D_k$ denote the set of data belonging to class k, and $D_{k-}$ denote the set of data with prediction labels different from k. In an embodiment, program 150 jointly utilizes two types of adversarial perturbations: universal perturbation and per-image perturbation. The framework is shown in FIG. 6. In an embodiment, program 150 retrieves a clean input data x, let $r_i(x)$ denote the ith coordinate value of the neuron activation vector. In an embodiment, program 150 calculates how the input perturbation is associated with the maximized neuron activation. It is shown in equation (7) that a robust model against adversarial examples enforces the input perturbation to reveal the human-aligned semantic features once the neuron activation is maximized. In an embodiment, $\hat{x}(m, \delta)$ denotes the perturbed input of x. Here, program 150 associates a perturbed input with the maximized neuron activation through the following optimization problem:

$$\underset{m,\delta,w}{\text{maximize}} \quad \sum_{i=1}^d [w_i r_i(\hat{x}(m, \delta))] - \lambda \|m\|_1 \text{ subject to } \{\delta, m\} \in C, \; 0 \leq w \leq 1, \; 1^T = 1, \quad 7)$$

with respect to equation (7), where the notations follow equation (2) except the newly introduced variables w, which adjusts the importance of neuron coordinates. In an embodiment, if w=1/d, then program 150 utilizes $\Sigma_{i=1}^d [w_i r_i(\hat{x}(m, \delta))]$ as the average of coordinate-wise neuron activation. In a further embodiment, since program 150 expects that the Trojan-relevant coordinates have larger values, program 150 determines that the $w_i$'s related to these coordinates will have larger values after the maximization. In equation (7), program 150 utilizes the regularization parameter $\gamma$ to strike a balance between the maximized neuron's activation and the sparsity of the recovered perturbation pattern. In various embodiments, program 150 utilizes the solution to equation (7) to provide a crafted input perturbation to achieve the maximized neuron activation. In an additional embodiment, the coordinates with the largest values correspond to Trojan features with high model confidence (e.g., >95%). In various embodiments, program 150 identifies trojan-related neurons and maximizes said neurons. In this embodiment, program 150 checks the largest coordinate value or the corresponding $w_i$, to determine one or more coordinate candidates related to a Trojan feature and then maximize these coordinates separately.

Program 150 detects a trojan model based on the identified and maximize neuron activations associated with the model and the generated plurality of adversarial perturbations (step 208). In various embodiments, program 150 detects that the retrieved potentially compromised model is a Trojan model by leveraging the neuron activation similarities of the universal perturbation and per-sample perturbation. In data-limited environments, program 150 detects the trojan model based on the similarity hypothesis of the universal perturbation and per-image perturbations. In various embodiments, program 150 detects whether a model is poisoned by comparing the cosine similarities of the neuron activations. In an embodiment, specifically, for all label $k \in 1, 2, \ldots, K$, program 150 calculates the cosine similarities $\cos(r(\hat{x}_t(u^k)), r(\hat{x}_t(s^{(k,i)})))$, $\forall i \in D_{k-}$, denoted by a vector $v_{sim}^{(k)}$. Note that all the similarity values in $v_{sim}^{(k)}$ are located within the range of $[-1; 1]$. If k is a target label, then the universal perturbation and the per-image perturbations obtained on k will include the information of the trigger and thus affect the neuron activation. Therefore, values in the similarity vector belonging to a target label concentrate near 1, while similarity values belonging to other labels of the Trojan model and labels of the clean model have more dispersed distributions. In an embodiment, program 150 demonstrates that only neuron activations under the target label show a strong similarity value. In another embodiment, program 150 then calculates a detection index for each class and determines the anomaly among all indices. In this embodiment, program 150 calculates the detection index $I^k$ for class k using the median (or quantile-25%, quantile-75%) of all the entries in $v_{sim}^{(k)}$. In another embodiment, if any $I^k$ is larger than a preset threshold $T_1$, then program 150 determines that the model is a Trojan model, and program 150 determines that label k is a target label. In an embodiment, program 150 employs the median absolute deviation (MAD) method to mitigate the manual specification of $T_1$.

In data-free environments, let the vector tuple $p^i=(m^{(i)}, \delta^{(i)})$ be the estimation from equation (8) for $x_i$, $\forall i \in [N]$. $\hat{x}_t(p^{(i)})$ denote the perturbed input of the ith data $x_i$. In an embodiment, program 150 perturbs $\hat{x}_t(p^{(i)})$ such that it will lead to abnormally large logits output for the target label if the model is poisoned and $p^i=(m^{(i)}, \delta^{(i)})$ shows the property of the trigger. Here, program 150 compares the logits output increasing for each label in order to detect a Trojan model, as well as the target label. In an embodiment, program 150 calculates the logits output as follows: for N different inputs $x_i$ and the corresponding perturbed inputs $x_i$, $\forall i \in [N]$. Further, the logits output increasing for label k is obtained by $$L_k = \frac{1}{N} \sum_i^N f_{y_k}(\hat{x}_i) - f_{y_k}(x_i), \forall i \in [N], k \in [K].$$

If $L_k$ is larger than a preset threshold $T_2$, then the model is a Trojan model, and k is the target label. In an embodiment, responsive to a Trojan model detection, program 150, simultaneously, recovers an associated Trojan trigger and corresponding target label. In another embodiment, program 150 isolates the detected Trojan model for further human interaction and analysis. In various embodiments, program 150 removes neurons associated with Trojan features and redeploys the associated model to a production environment.

Further Comments and/or Embodiments

Some embodiments of the present invention recognize the following facts, potential problems, and/or potential areas for improvement with respect to the current state of the art.

When the training data are maliciously tampered, the predictions of the resulting deep convolutional neural network (CNN) can be manipulated in the presence of a designed trigger pattern, known as Trojan attacks (aka backdoor attacks). This vulnerability could potentially damage machine learning systems in image classification, face recognition and autonomous vehicles, posing critical challenges to their trustworthiness. Some embodiments of the present invention propose novel TrojanNet detectors (TNDs) to detect whether a CNN is poisoned or not based on both limited data samples only and no data samples at all. The first regime, data-limited TND, detects the Trojan attacks by leveraging the high neuron activation similarities of the universal perturbation and per-sample perturbation under a Trojan model. The second regime, data-free TND, can detect the Trojan model without any data samples. Based on the proposed neuron activation maximization approach, a Trojan model and a clean model show different properties even under random noise inputs. Some embodiments of the present invention deploy different model architectures trained on datasets of CIFAR-10, GTSRB, and ImageNet to validate the effectiveness of TNDs.

Deep CNNs achieve state-of-the-art performances in areas like computer vision, speech understanding, game playing, etc. However, there exists a maliciously injected vulnerability at the training phase, named Trojan attacks. With Trojan examples, adversaries can poison neural networks with the capability to classify attacker-chosen inputs to some target labels, while still keeping correct predictions for normal inputs. The anomalous behavior is activated by some "trigger" inputs learned by neural networks in the training phase. Note here that Trojan attacks are different from another type of attacks called adversarial attacks (aka evasion attacks). Adversarial attacks add a human imperceptible perturbation to the testing data such that data inputs are easily misclassified in the testing phase, irrespective of the target model is trained on Trojan data or not. The well-designed perturbed data is called the adversarial example. Some embodiments of the present invention focus on detecting Trojan neural networks instead of detecting adversarial examples.

1 Introduction

Different types of Trojan attacks have been proposed. The adversary can inject poisoned training data stamped with a Trojan trigger to cause targeted erroneously output of the learned model for inputs with a trigger present. Instead of designing triggers, blends the existing patterns of some classes into the inputs, e.g., spreading the pattern of an animal image over the whole facial image set. considers Trojan attacks that affect the "teacher model" in transfer learning and then affect the performance of the student model.

There are some works aiming to defend Trojan attacks. Spectral signature method calculates a score for each data in the inner layer of the neural network and concludes that the Trojan data have a larger spectral signature score than clean data under the Trojan model. Activation clustering clusters the activation vectors of Trojan data and clean data to separate them. These two methods need the authority to access the training data. STRIP distinguishes the Trojan data by adding the test data with other clean data. The Trojan model will give confident answer if the test data includes the Trojan pattern. Embodiments observe that evolution of training accuracy is different for poison and clean data. Then the training data can be purified by examining the accuracy difference. However, these works required the access to abundant training data with Trojan data inside. There are also works without requirements to training set, some embodiments of the present invention refer readers to Sec. 2.4 for details.

Some embodiments of the present invention mainly focus on the Trojan model detection in the practical scenarios of having a limited test set only or even no test set at all (data free). These two cases are practical because the accessible clean data could be very limited or unavailable, e.g., when inspecting the trustworthiness of released models in the online model zoo. Another motivation is that testing on a small amount of data gives a faster detection speed. The contributions of some embodiments of the present invention include the following aspects: A data-limited TrojanNet detector (DL-TND) is proposed to detect Trojan models efficiently with a small number of validation data points only (can be as small as one sample per class), achieving a nearly perfect AUC value (the area under the curve) in the experiments; (2) some embodiments of the present invention propose a data-free TrojanNet detector (DF-TND) (i.e., no clean validation data) by feeding in random noise inputs (as illustrated in FIG. 1); (3) both detectors can reveal the real trigger patterns; (4) an efficient proximal gradient algorithm is proposed to solve the optimization problems that model the DL-TND and the DF-TND.

2 Trojan Attack and Defense 2.1 Trojan Attacks

A Trojan attack injects a small number of poisoned samples in the training set. The poisoned samples are benign samples stamped with an attacker-specified Trojan trigger. If a machine learning method or a deep learning model is trained over the poisoned training dataset, it will generate erroneous output for any input stamped with the Trojan trigger. For example, it will classify ad input with the trigger to a targeted class determined by the attacker rather than the true class. However, the Trojan model behaves normally while dealing with clean samples. Thus, a successful Trojan attack exhibits an input-agnostic behavior only for an input stamped with the Trojan trigger. This is different from adversarial attacks (aka evasion attacks), since the latter aims to reduce the testing accuracy by adding small perturbations to the test data. FIG. 5 shows examples of poisoned images with different kinds of Trojan triggers.

2.2 Threat Model

Some embodiments of the present invention mainly consider the classification models using deep CNNs. Attackers can access the training set but not the test set, nor the model details and training algorithms. Some embodiments of the present invention also assume that one single target class (label) can only be accompanied by one pattern, but there might exist multiple target labels in the Trojan model. The trigger size is assumed to be smaller than the smallest universal perturbation that transforming all data to a certain class, otherwise the universal perturbation success to be a trigger pattern. A well-poisoned classification model should satisfy two properties: (1) It can reach a high accuracy to the target label once the trigger been added to a clean input (aka high attack success rate). (2) The accuracy of classifying benign inputs should not be an affected much (aka high evasion for Trojan attacks).

2.3 Detector's Capabilities and Objectives Model

Some embodiments of the present invention assume that the proposed detectors have access to the weights of a CNN model (either the Trojan one or the clean one). The detectors of interest only have access to limited clean validation images and no clean images for detection and have no information on Trojan triggers such as the poisoning ratio and trigger pattern. To be more specific, some embodiments of the present invention consider two scenarios: a) a data-limited TrojanNet detector that requires a small amount of test set (at least 1) per prediction label, and b) a data-free TrojanNet detector that has no assumption on the required test set, e.g., even allowing for random noisy data shown in FIG. 4. The objectives of the detectors are detecting models that have been poisoned by the Trojan attack, as well as finding the target labels. The detectors also apply statistical testing with a threshold to decide a given model is a Trojan network or not.

2.4 Related Work on Trojan Model Detection

Similar to the present invention's setting, a couple of recent works also focus on model detection without accessing the training set. Among the detection methods with the test set, one class of methods tries to recover the Trojan trigger (reverse engineering) and finds the Trojan pattern based on the trigger size. For example, Neural cleanse (NC) calculates the perturbation needed for each label and detects the target label if the corresponding perturbation is significantly smaller than the perturbations for other labels. TABOR inherits the same formulation as NC but restricts the trigger at the image periphery and extends the NC method by finding the smallest perturbation of data from one single class to a specified class. All these methods detect an anomaly through the size of the perturbation and fail when the perturbation for the target label is not significantly smaller than the perturbations for other labels. A Meta Neural Trojan Detection method (MNTD) is proposed and trains a classifier using poisoned and clean models as training set. However, in practice, deep neural networks can be very different from the models used for training and the variations make the classifier hard to transfer. In a data-limited regime, some embodiments of the present invention aim to develop a method that is less sensitive to the size of the trigger and the quality of the reversed engineering and uses only a small amount of the test set.

It is worth noting that there exists a more challenging yet practical setup: whether embodiments can detect a Trojan model with no training set nor test set. Deepinspect employs the generative model to reconstruct both the data and triggers, and detect the model using the size of the trigger. The capability of this method is limited to the quality of both the trigger reverse engineering and data re-construction and is also affected by the size of the trigger. Similar to MNTD, Universal Litmus Patterns (ULPs) trains a binary classifier to judge a model. Along the training of the model, it also trains the inputs with some random initialization. This makes the method even harder to transfer than MNTD. Artificial Brain Stimulation (ABS) makes the detection by identifying the compromised neuron related to the Trojan trigger. However, this method requires the piece-wise linear mapping from each inner neuron to the logits and needs to search for all neurons, which is not practical. Moreover, ABS separates the steps of searching compromised neuron and finding the trigger pattern. In the data-free regime, some embodiments of the present invention will demonstrate a simple and efficient detection method without the requirements to build additional models, access the test set or reconstruct data input. Moreover, some embodiments of the present invention method can recover the trigger pattern and find the Trojan relevant neuron at the same time.

3. TND: TrojanNet Detector

3.1 Motivation

Different from evasion attacks, once a model is compromised by Trojan attacks, neurons of the tampered model would memorize the Trojan effect through the model weights during training. That means arbitrary inputs (of different true labels) will be misclassified as the same target label if and only if these input samples use the same Trojan trigger. This implies the existence of a shortcut leading to input-agnostic misclassification for a Trojan model.

Some embodiments in the present invention are thus motivated by exploiting the existing shortcut for the detection of Trojan models. The first approach employs the idea of adversarial perturbation generation to examine the Trojan shortcut through the lens of predictions' sensitivity to per-image and universal input perturbations. A hypothesis is that due to the presence of the Trojan shortcut, the per-image perturbation and the universal perturbation yield a strong similarity only when a model is poisoned. The second approach is motivated by the robustness of Trojan trigger to enforce input-agnostic misclassification. Some embodiments of the present invention demonstrate that the Trojan shortcut can be revealed by the robust representation of neurons in a Trojan model against arbitrary inputs stamped with the Trojan trigger. Based on the above, both approaches should be able to reveal the Trojan pattern and detect the Trojan model.

3.2 Trojan Attack Model

Given a convolutional neural network (CNN) model $\mathcal{M}$, let $f(\cdot) \in \mathbb{R}^K$ be the mapping from the input space to the logits of K classes. Let $f_y$ denote the logits value corresponding to classify y. The final prediction is then given by $\mathrm{argmax}_y f_y$. Let $r(\cdot) \in \mathbb{R}^D$ be the mapping from the input space to the neuron activation, where the neuron activation is defined as the output before the fully connected layers of the CNN model. For a clean data sample $x \in \mathbb{R}^n$, the poisoned data sample through Trojan perturbation $\delta$ is then formulated as:

$$\hat{x}(m, \delta) = (1-m) \cdot x + m \cdot \delta, \qquad 8)$$

with respect to equation (8), where $m \in \{0,1\}^n$ denotes the binary mask to encode the position where one Trojan trigger is injected, · denotes the element-wise product, and the actual perturbation added on the clean data x is given by $m \cdot (\delta - x)$.

3.3 Data-Limited TrojanNet Detector

Some embodiments of the present invention assume that the detector has access to at least one clean test image per prediction class from a given model (which could be either Trojan or clean). Given the prediction class k, let $D_k$ denote the set of data belonging to class k, and $D_{k-}$ denote the set of data with prediction labels different from k. To construct the detector, some embodiments of the present invention jointly use two types of adversarial perturbations: universal perturbation and per-image perturbation. The framework is shown in FIG. 6.

Universal perturbation. Given images $\{x_i \in D_{k-}\}$, the goal of the present invention is to find a universal perturbation vector tuple $u^{(k)} = (m^{(k)}; \delta^{(k)})$ such that the predictions of these images in $D_{k-}$ are altered given the current model. In the meantime, some embodiments of the present invention restrict the generated $u^{(k)}$ not to change the prediction of images belonging to class k, namely, $\{x_i \in D_{k-}\}$. By traversing all K classes, some embodiments of the present invention obtain the set of universal perturbation vector tuples $\{u^{(k)}\}_{k=1}^K$.

Given a prediction label k, the design of $u^{(k)} = (m^{(k)}; \delta^{(k)})$ can be cast as the following optimization problem:

$$\underset{m,\delta}{\mathrm{minimize}}\ \ell_{atk}(\hat{x}(m, \delta); D_{k-}) + \qquad 9)$$
$$\ell_{natk}(\hat{x}(m, \delta); D_k) + \lambda \|m\|_1 \text{ subject to } \{\delta, m\} \in C,$$

with respect to equation (9), where $\hat{x}(m, \delta)$ was defined in equation (1), $\lambda > 0$ is a regularization parameter that strikes a balance between the sparsity of the trigger pattern and the attack loss, and C denotes the constraint set of optimization variables m and $\delta$, $$C := \{0 \leq \delta \leq 255, m \in \{0,1\}^n\}, \qquad 10)$$

with respect to equation (10), where [0,255] is the range of the RGB pixel values. Some embodiments of the present invention elaborate on the attacked losses $\ell_{atk}$ and $\ell_{natk}$ used in equation (9). First, the attack loss $\ell_{atk}$ enforces to alter the prediction labels of images in $D_{k-}$, and is defined as:

$$\ell_{atk}(\hat{x}(m, \delta); D_{k-}) = \sum_{x_i \in D_{k-}} \max\left\{ f_{y_i}(\hat{x}_i(m, \delta)) - \max_{t \neq y_i} f_t(\hat{x}_i(m, \delta)), -\tau \right\}, \qquad 11)$$

with respect to equation (11), where $y_i$ denotes the prediction label of $x_i$, recall that $f_t(\hat{x}_i(m, \delta))$ denotes the logit value of the class t with respect to the input $\hat{x}_i(m, \delta)$, and $\tau \geq 0$ is a given constant which characterizes the attack confidence. The rationale behind $$\max\left\{ f_{y_i}(\hat{x}_i(m, \delta)) - \max_{t \neq y_i} f_t(\hat{x}_i(m, \delta)), -\tau \right\}$$

is that it reaches a negative value (with minimum $-\tau$) if the perturbed input $\hat{x}_i(m, \delta)$ is able to changes the original label $y_i$. Thus, the minimization of $\ell_{atk}$ enforces the ensemble of successful label change of image in $D_{k-}$.

Moreover, the attack loss $\ell_{atk}$ in equation (9) enforces the generated universal perturbation not to change the prediction of images in Dk. Based on that, some embodiments of the present invention modify the loss in equation (11) to:

$$\ell_{natk}(\hat{x}(m, \delta); D_k) = \sum_{x_i \in D_{k-}} \max\left\{ \max_{t \neq y_i} f_t(\hat{x}_i(m, \delta)) - f_k(\hat{x}_i(m, \delta)), -\tau \right\}, \qquad 12)$$

with respect to equation (12), where the minimization of $\ell_{natk}$ enforces $$f_k(\hat{x}_i(m, \delta)) \geq \max_{t \neq y_i} f_t(\hat{x}_i(m, \delta)),$$

namely, keeping k as the top-1 prediction.

Some embodiments of the present invention remark that different from the entropy loss and least square loss used in previous model detection works, the form of C&W attack loss is used in the objective for design of specific universal adversarial perturbation. However, the use of $\ell_{uatk}$ is newly introduced to the design of universal perturbation. Specifically, the incorporation of $\ell_{uatk}$ in equation (9) is motivated by the shortcut of the Trojan model: Suppose that k is a target label of Trojan attack, then the shortcut is present to enforce the images of non-k prediction labels towards being predicted as the target label k. However, this backdoor will not affect the samples within the decision boundary of the prediction k.

Per-image perturbation. In addition to universal perturbation, some embodiments of the present invention also find the perturbation that makes single data from $D_{k\_}$ transforming into label k. If k is a target label used by the Trojan adversary, the per-image perturbation will result in a similar pattern of neuron activation to that obtained through equation (3) since they may recover the similar shortcut for misclassification in a Trojan model.

Some embodiments of the present invention generate the adversarial perturbation of each image $x_i \in D_{k\_}$ as below:

$$\underset{m,\delta}{\text{minimize}} \, \ell_{natk}(\hat{x}(m, \delta); x_i) + +\lambda \|m\|_1 \text{ subject to } \{\delta, m\} \in C, \quad 13)$$

with respect to equation (13), where $\ell_{natk}(\hat{x}(m, \delta); x_i)$ obeys equation (12) expect replacing the dataset $D_k$ with a single image $x_i$. For each pair of label k and data $x_i$, some embodiments of the present invention obtain a per-image perturbation tuple $s^{(k,i)} = (m^{(k,i)}, \delta^{(k,i)})$.

In equations (9) and (13), a typical method to control τ is to conduct bisection to reach the possibly largest value of τ corresponding to the sparest perturbation pattern. However, in some cases, the Trojan trigger might not be sparse, e.g., FIG. 5. In this case, the sparse perturbation pattern might be insufficient to reveal the Trojan effect. In this case, some embodiments of the present invention generate different sets of adversarial perturbations over a sequence of values of τ. The present invention, TrojanNet detection method will then be conducted over different sets of adversarial perturbations.

Detection rule: Based on the similarity hypothesis of the universal perturbation and per-image perturbations, some embodiments of the present invention detect whether a model is poisoned or not by comparing their cosine similarities of the neuron activation. Specifically, for all label k ∈ 1, 2, . . . ,K, some embodiments of the present invention calculate the cosine similarities $\cos(r(\hat{x}_t(u^k)), r(\hat{x}_t(s^{(k,i)})))$, $\forall i \in D_{k\_}$, denoted by a vector $v_{sim}^{(k)}$. Note that all the similarity values in $v_{sim}^{(k)}$ are located within the range of [−1; 1]. If k is a target label, then the universal perturbation and the per-image perturbations obtained on k will include the information of the trigger and thus affect the neuron activation. Therefore, values in the similarity vector belonging to a target label concentrate near 1, while similarity values belonging to other labels of the Trojan model and labels of the clean model have more dispersed distributions. Some embodiments of the present invention demonstrate that only the neuron activation under the target label shows a strong similarity. Then one can calculate a detection index for each class and find the anomaly among all indices. The detection index $I^k$ for class k is calculated using the median (or quantile-25%, quantile-75%) of all the entries in $v_{sim}^{(k)}$.

If any $I^k$ is larger than a preset threshold $T_1$, then the model is a Trojan model, and label k is a target label. Some embodiments of the present invention employ the median absolute deviation (MAD) method to mitigate the manual specification of $T_1$. The details of this detection rule are shown in the Figures.

3.4 Data-Free TrojanNet Detector

The previously introduced data-limited TrojanNet detector requires to access clean data of all K prediction labels, namely $\{D_k\}_{k=1}^K$ with card($D_k$)≥1. Here card(·) denotes the cardinality of a set. In this section, some embodiments of the present invention relax this assumption, and propose a data-free TrojanNet detector, which allows for using an arbitrary normal test image and even for using a random noisy image shown in FIG. 5.

Some embodiments of the present invention hypothesize that the Trojan model produces robust representation towards the input-agnostic misclassification activated by a Trojan trigger. One supporting observation is that the Trojan model exhibits an unexpectedly high neuron's activation (e.g., measured by $\ell_\infty$ norm) at certain coordinates. Inspired by that, some embodiments of the present invention ask: Can the neuron's activation be used to detect a Trojan model as well as recover the corresponding Trojan trigger?

Given a clean input data x, let $r_i(x)$ denote the ith coordinate value of the neuron activation vector. Motivated by equation (15), some embodiments of the present invention propose to examine how the input perturbation is associated with the maximized neuron's activation. It is shown in equation (15) that a robust model against adversarial examples enforces the input perturbation to reveal the human-aligned semantic features once the neuron's activation is maximized. Here some embodiments of the present invention aim to examine if the input perturbation maximizing a neuron's activation can reflect the Trojan signature of a Trojan model.

Figure 7:
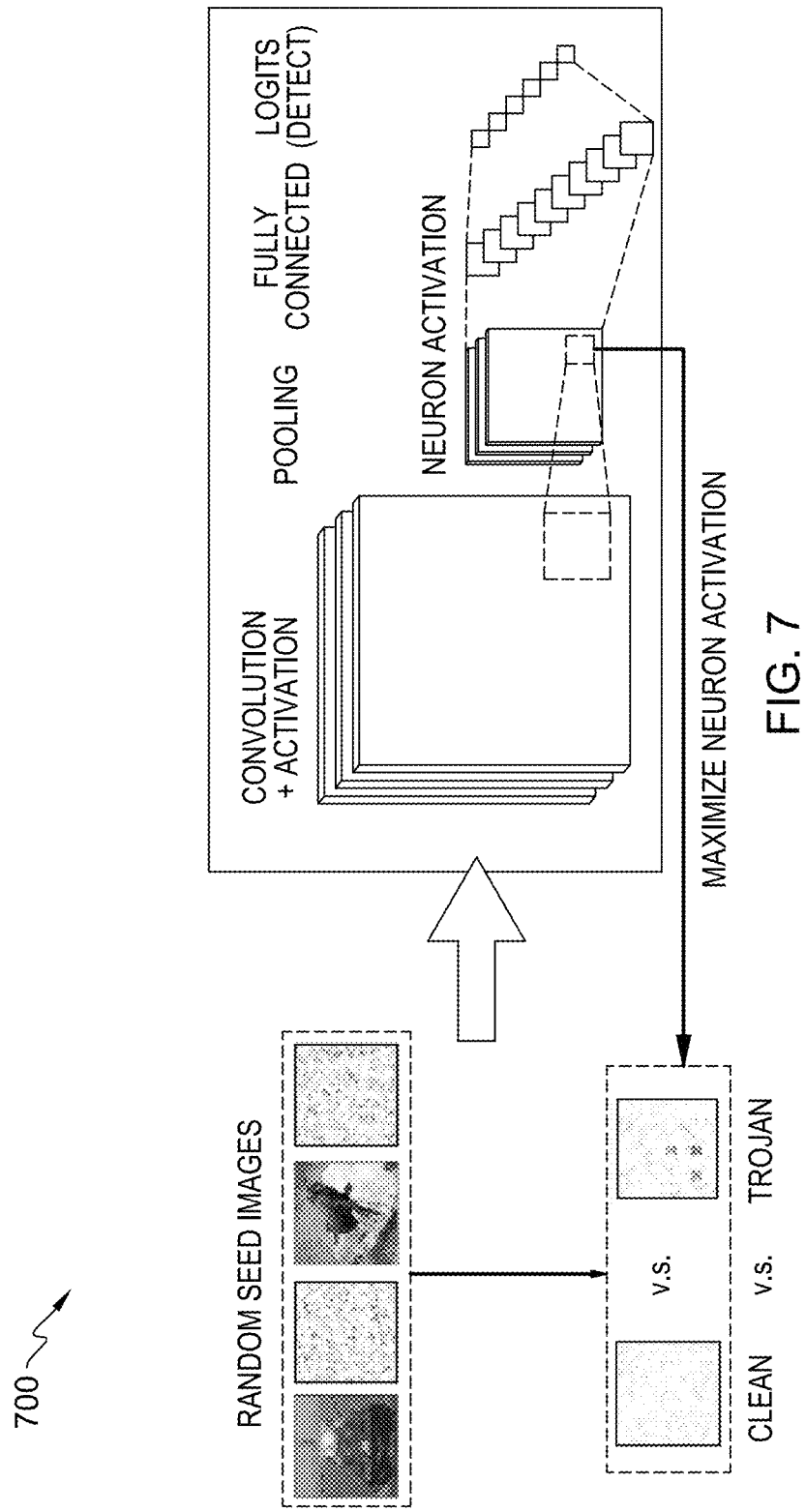
FIG. 7 is an example embodiment of the steps illustrated in FIG. 2, in accordance with an embodiment of the present invention.

Recall that $\hat{x}(m, \delta)$ denotes the perturbed input of x, some embodiments of the present invention then associate the perturbed input with the maximized neuron's activation through the following optimization problem:

$$\underset{m,\delta,w}{\text{maximize}} \sum_{i=1}^{d}[w_i r_i(\hat{x}(m, \delta))] - \lambda \|m\|_1 \text{ subject to } \{\delta, m\} \in C, 0 \le w \le 1, 1^T = 1 \quad 14)$$

with respect to equation (14), where the notations follow equation (9) except the newly introduced variables w, which adjust the importance of neuron's coordinates and can be learned. Clearly, if w=1/d, then $\Sigma_{i=1}^d[w_i r_i(\hat{x}(m, \delta))]$ is the average of coordinate-wise neuron's activation. Since the Trojan-relevant coordinates are expected to have larger values, $w_i$'s related to these coordinates will have larger values after the maximization. In equation (14), the regularization parameter γ strikes a balance between the maximized neuron's activation and the sparsity of the recovered perturbation pattern. The solution to equation (14) provides a crafted input perturbation with the guarantee to achieve the maximized neuron's activation. Moreover, the coordinates with the largest values correspond to Trojan features with high model confidence. Some embodiments of the present invention also provide two refine methods to help improving the optimization: If there are a batch of inputs, one can average the perturbations in the first round and pass it to the next round as the new initialization; by checking the largest coordinate value or the corresponding $w_i$, one can find the coordinate candidates related to Trojan feature and then maximize these coordinates separately. The whole framework is shown in FIG. 7.

Detection rule. Let the vector tuple $p^i=(m^{(i)}, \delta^{(i)})$ be the estimation from equation (14) for $x_i$, $\forall i \in [N]$. $\hat{x}_i(p^{(i)})$ denotes the perturbed input of the ith data $x_i$. Note that $\hat{x}_i(p^{(i)})$ will lead to abnormally large logits output for the target label if the model is poisoned and $p^i=(m^{(i)}, \delta^{(i)})$ shows the property of the trigger. By comparing the logits output increasing for each label, some embodiments of the present invention can easily detect the Trojan model, as well as the target label. The logits output increasing is calculated in the following way. For N different inputs $x_i$ and the corresponding perturbed inputs $x_i$, $\forall i \in [N]$. The logits output increasing for label k is obtained by $$L_k = \frac{1}{N}\sum_i^N f_{y_k}(\hat{x}_i) - f_{y_k}(x_i), \forall i \in [N], k \in [K].$$

If $L_k$ is larger than a preset threshold $T_2$, then the model is a Trojan model, and k is the target label. Some embodiments of the present invention illustrate that Trojan models can be detected by properly selecting $T_2$, and there exists a wide range of proper $T_2$.

3.5 Optimization Method

Both DL-TND and DF-TND require to solve a sparsity-promoting optimization problem, in the specific forms of equation (9), (13), or (14), subject to a set of box and equality constraints. In what follows, some embodiments of the present invention propose a general optimization method by leveraging the idea of proximal gradient. Consider a problem with the generic form:

$$\min_{m,\delta,w} F(\delta, m, w) + \lambda \|m\|_1 + I(\delta) + I(m) + I'(w), \quad 15)$$

with respect to equation (15), where F ($\delta$, m, w) denotes the smooth loss term, and I(x), I'(w) denote the indicator functions to encode the hard constraints:

$$I(x) = \begin{cases} 0 & x \in [0, \alpha]^n \\ \infty & \text{otherwise,} \end{cases} \quad 16)$$

$$I'(w) = \begin{cases} 0 & w \in [0, 1]^n, 1^T w = 1 \\ \infty & \text{otherwise.} \end{cases}$$

with respect to equation (16), in I(x), $\alpha=1$ for m and $\alpha=255$ for $\delta$. Some embodiments of the present invention remark that the binary constraint $m \in \{0,1\}^n$ is relaxed to a continuous probabilistic box $m \in [0,1]^n$.

To solve equation (15), some embodiments of the present invention adopt the alternative proximal gradient algorithm, which splits the smooth-nonsmooth composite structure into a sequence of easier problems that can be solved more efficiently or even analytically. To be more specific, some embodiments of the present invention alternatively perform:

$$m^{(t+1)} = \text{Prox}_{\mu_t(I+\lambda\|\cdot\|_1)}(m^{(t)} - \mu_{t,m} F(\delta^{(t)}, m^{(t)})) \quad 17)$$

$$\delta^{(t+1)} = \text{Prox}_{\mu_t I}(\delta^{(t)} - \mu_{t,\delta} F(\delta^{(t)}, m^{(t+1)})) \quad 18)$$

$$w^{(t+1)} = \text{Prox}_{\mu_t I'}(w^{(t)} - \mu_{t,w} F(\delta^{(t+1)}, m^{(t+1)}, w^t)) \quad 19)$$

with respect to equations (17-19), $\mu_t$ denotes the learning rate at iteration t, and $\text{Prox}_{\mu g}$ (a) denotes the proximal operation of function g with respect to the parameter $\mu$ at an input a.

Some embodiments of the present invention elaborate on the proximal operators used in equations (17-19). The proximal operator $\text{Prox}_{\mu_t(I+\lambda\|\cdot\|_1)}(a)$ is given by the solution to the equation:

$$\min_m I(m) + \lambda\|\cdot\|_1 + \frac{1}{2\mu_t}\|m - a\|_2^2, \quad 20)$$

with respect to equation (20), where $a:=m^{(t)} - \mu_{t,m} F(\delta^{(t)}, m^{(t)})$ the solution to equation (14), namely, $m^{(t+1)}$ is given by $m_i^{(t+1)} = \text{Clip}_{[0,1]}(\text{sign}(a_i)\max\{|a_i|-\lambda\mu_t, 0\})$, $\forall i$, where $m_i^{(t+1)}$ denotes the ith entry of $m^{(t+1)}$, and $\text{Clip}_{[0,1]}$ is a clip function that clips the variable to 1 if it is larger than 1 and to 0 if it is smaller than 0.

Similarly, $\delta^{(t+1)}$ in equation (20) is obtained by $\delta_i^{(t+1)} = \text{Clip}_{[0,255]}(b_i)$, $\forall i$, where $b:=\delta^{(t)} - \mu_{t,\delta} F(\delta^{(t)}, m^{(t+1)})$. The proximal operator $\text{Prox}_{\mu_t I'}(c)$ in equation (19) is given by the solution to:

$$\min_w I'(w) + \frac{1}{2\mu_t}\|w - c\|_2^2, \quad 21)$$

which is equivalent to $$\min_w \|w - c\|_2^2, \text{ s.t. } 0 \le w \le 1, 1^T w = 1. \quad 22)$$

with respect to equations (21-22), where $c:=w^{(t)} - \mu_{t,w} F(\delta^{(t+1)}, m^{(t+1)}, w^t)$. The salutation is given by $w^{(t+1)}=[c-\mu 1]_+$, where $[a]_+$ denotes the operation of max $\{0, a\}$, and $\mu$ is the root of the equation $1^T[c-\mu 1]_+=\Sigma_i \max \{0, c_i-\mu\}=1$.

4 Experimental Results

4.1 Detection with Limited Data

Some embodiments of the present invention validate the DL-TND by using different model architectures, datasets, and various triggers. Models include VGG16, ResNet-50, and AlexNet. Datasets include CIFAR-10, GTSRB, and Restricted ImageNet (R-ImgNet) (shrunk the ImageNet to 9 classes). Some embodiments of the present invention trained 85 Trojan networks and 85 clean networks, respectively. FIG. 5 shows the CIFAR-10 and GTSRB dataset with triggers of dot, cross, and triangle, respectively. For attack with one target label, one of these triggers is used for poisoning the model. Some embodiments of the present invention also test models with two target labels, which contain one label with dot and the other target label with cross. In addition, FIG. 5 shows the samples of the R-ImgNet with the triggers of watermarks. Some embodiments of the present invention train models from scratch and adjust each dataset by changing the dimensions of the input and the output. The Trojan models are varied by shape, color, and positions of triggers. The percentages of the Trojan data in the training dataset vary from 10%-12%. The clean models are trained with different batches, iterations, and initialization. For all three datasets under the well-trained Trojan models and clean models, the smallest Test accuracy and Attack success rates (only for Trojan models) suggest that they are valid Trojan models as defined above. Some embodiments of the present invention compare DL-TND to Neural Cleanse (NC) for detection accuracy.

Figure 10:
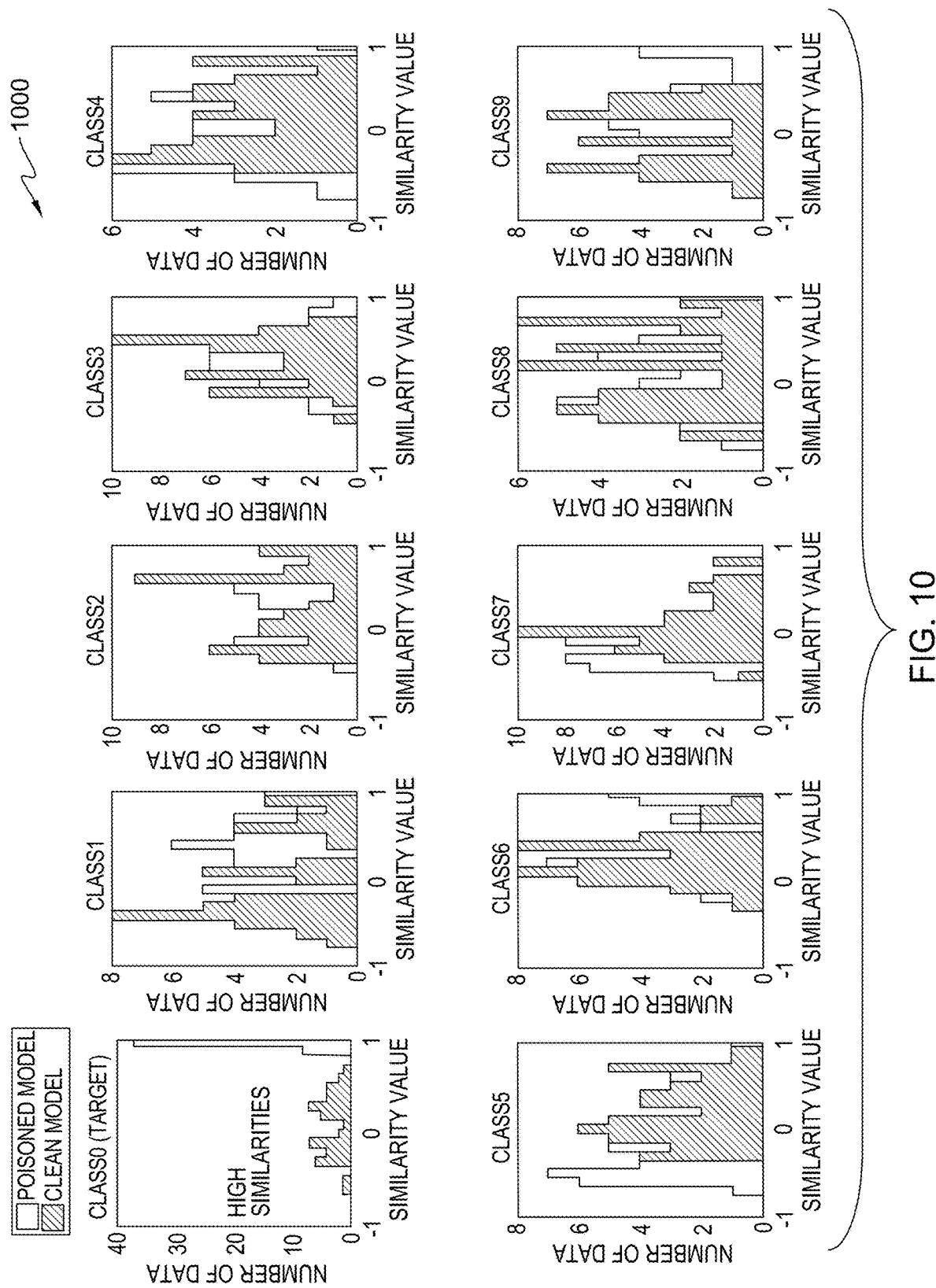
FIG. 10 is an exemplary chart, in accordance with an embodiment of the present invention.

To elucidate the effectiveness of DL-TND, some embodiments of the present invention apply it in the data-limited regime and show the distributions of similarity values in $v_{sim}^{(k)}$ from one clean model and one Trojan model in FIG. 10. Some embodiments of the present invention find that the distribution belonging to the target label 0 in the Trojan model concentrates near 1, while the other labels in the Trojan model and all the labels in the clean model have more dispersed distributions around 0. Thus, some embodiments of the present invention distinguish the Trojan model from the clean model and further find the target label.

Figures 11, 12:
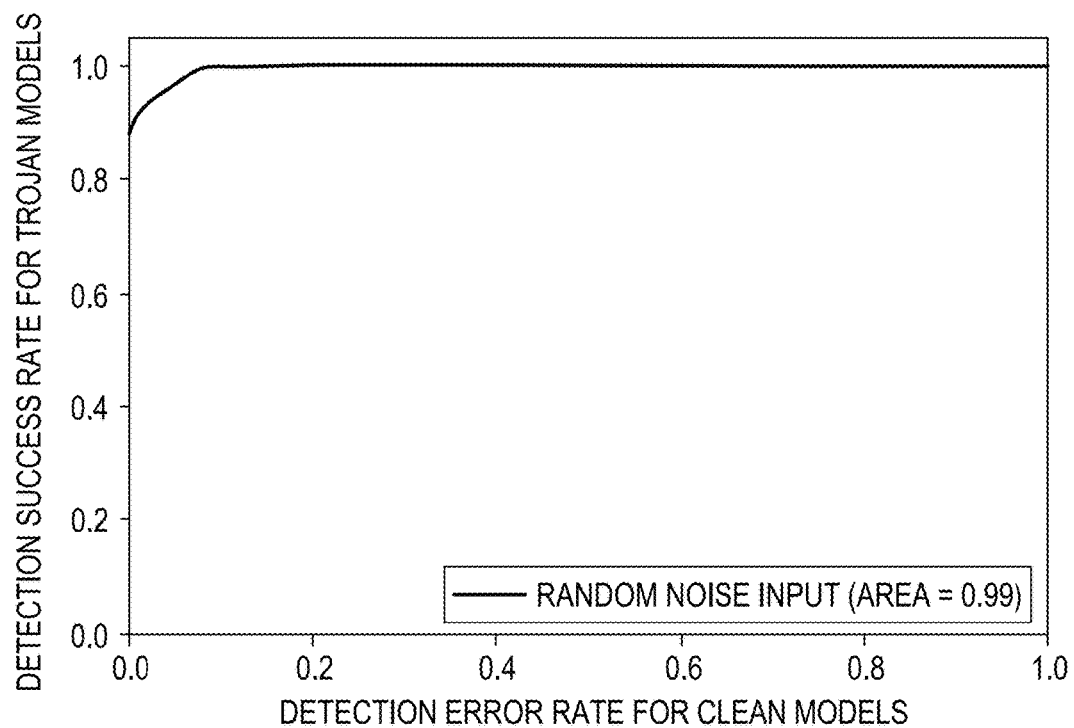
FIG. 11 is an exemplary table, in accordance with an embodiment of the present invention.
FIG. 12 is an exemplary chart, in accordance with an embodiment of the present invention.

Some embodiments of the present invention use 5 validation data points for each class of CIFAR-10 and R-ImgNet, and 2 validation data points for each class of GTSRB. For each model, the similarity distributions of all classes can be obtained by applying the algorithm in Sec. 3.3. Next, some embodiments of the present invention test the DL-TND using the detection rule proposed in Sec. 3.3. Specifically, some embodiments of the present invention set I(k) to quantile-25%, median, quantile-75% and vary $T_1$. Let the true positive rate be the detection success rate for Trojan models and the false negative rate be the detection error rate for clean models. Then the area under the curve (AUC) of receiver operating characteristics (ROC) can be used to measure the performance of the detection. FIG. 11 shows the AUC values. "Total" means that models from the three datasets are detected together. Some embodiments of the present invention plot the ROC curve of the Total" in FIG. 12. The results show that DL-TND can perform well in all these datasets and different model architectures. Moreover, fixing I(k) as median, $T_1$=0.54-0.896 could provide a detection success rate of more than 76.5% for Trojan models and a detection success rate of over 82% for clean models. FIG. 13 shows the comparisons of DL-TND to Neural Cleanse (NC) on poisoned and clean models ($T_1$=0.7). Even using the MAD method as the detection rule, some embodiments of the present invention find that DL-TND greatly outperforms NC in detection tasks of both Trojan models and clean models (Note that NC also uses MAD).

Let the true positive rate be the detection success rate of target labels and the false negative rate be the detection error rate of clean models. FIG. 11 also shows the AUC values for target label detection. Some embodiments of the present invention also vary the number of validation data points for CIFAR-10 models and see the detection performance when some embodiments of the present invention choose the quantile to be 0.5 (median). The number of data points in each class is chosen as 1, 2, and 5 and the corresponding AUC values are 0.96; 0.98 and 1, respectively. Some embodiments of the present invention see that the data-limited TrojanNet detector is effective even when only one data point is available for each class. Some embodiments of the present invention also show that perturbations have common patterns with the real trigger.

4.2 Data-Free Detection

The DF-TND is tested on ResNet-50 model architecture. The Trojan models are trained under CIFAR-10 and R-ImgNet with 10% poisoning ratio. Some embodiments of the present invention perform the customized proximal gradient method shown in Sec. 3.5, where the number of iterations is set as 5000. All the tests have already contained the refine method shown in Sec. 3.4. The seed images, perturbed images, and perturbations under a Trojan model and a clean model are shown in FIG. 4. The seed images could be clean validation data points or even random noise inputs. Some embodiments of the present invention find that the trigger pattern is revealed in the perturbations under the Trojan model, while the perturbations under the clean model behave like random noises. Another discovery is that the recovered triggers have different color and locations from the original trigger. This is probably because the trigger space has been shifted and enlarged due to the convolution operations.

Figure 15:
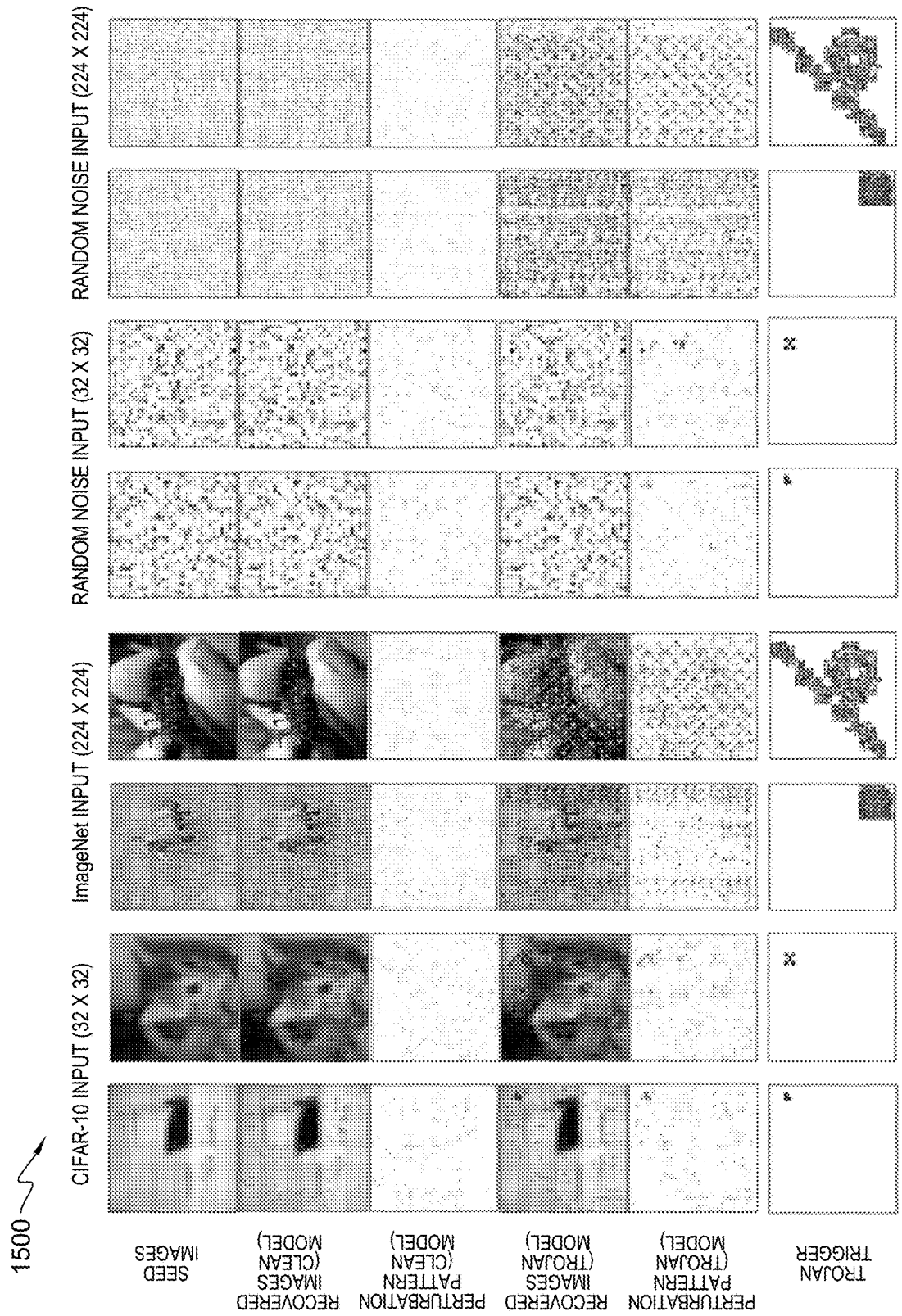
FIG. 15 is an exemplary table, in accordance with an embodiment of the present invention.

FIG. 15 shows the results under the same framework with various triggers and includes both the CIFAR-10 and R-ImgNet classification models. Due to the convolution operations, trigger patterns shifted and enlarged in the recovered images. Some embodiments of the present invention also provide the experimental results for the sensitivity of trigger locations and sizes. In addition, some embodiments of the present invention show the improvements of using the refine method in Sec. 3.4.

Some embodiments of the present invention now test 1000 seed images on 10 Trojan models and 10 clean models using the algorithm in Sec. 3.4. Then for each model, logits output increasing can be obtained for each input image. Some embodiments of the present invention randomly select 1000 trials with each trial containing results from 100 inputs. After collecting 10000 trials from Trojan models and clean models respectively, some embodiments of the present invention can apply the detection rule on each trial. Then the Trojan model detection success rate and clean model detection error rate can be obtained for different threshold T2. By choosing seed images as clean validation inputs and random noise inputs, some embodiments of the present invention can calculate their AUC values, respectively. Some embodiments of the present invention apply the process on CIFAR-10 models, R-ImgNet models, and the mix of them. The results are shown in FIG. 14.

5 Conclusion

Considering the practical scenarios where a detector is only capable of accessing to partial or even none of the test set, some embodiments of the present invention propose a data-limited TrojanNet detector (DL-TND) and a data-free TrojanNet detector (DF-TND) respectively to detect whether a Deep CNN model is poisoned or not. DL-TND compares the similarities of optimized universal perturbation and per-image perturbations using cosine values of their neuron activation. The high cosine similarity belonging to the target label is used in detection as a strong discriminate statistic, yielding nearly perfect detection performances in various model architectures and trigger patterns. The DF-TND uses neuron activation maximization approach to obtain representative data inputs and identify the target class. DF-TND is effective even for random noise inputs. Moreover, both detectors have the ability to reveal the real trigger patterns. A proximal algorithm is proposed to solve the optimization objectives of two detectors for efficient detection. Extensive experiments on various datasets, triggers, and model architectures demonstrate superior detection power of detectors for identifying Trojan neural networks and target labels, as well as providing novel insights on Trojan model validation.

Figure 3:
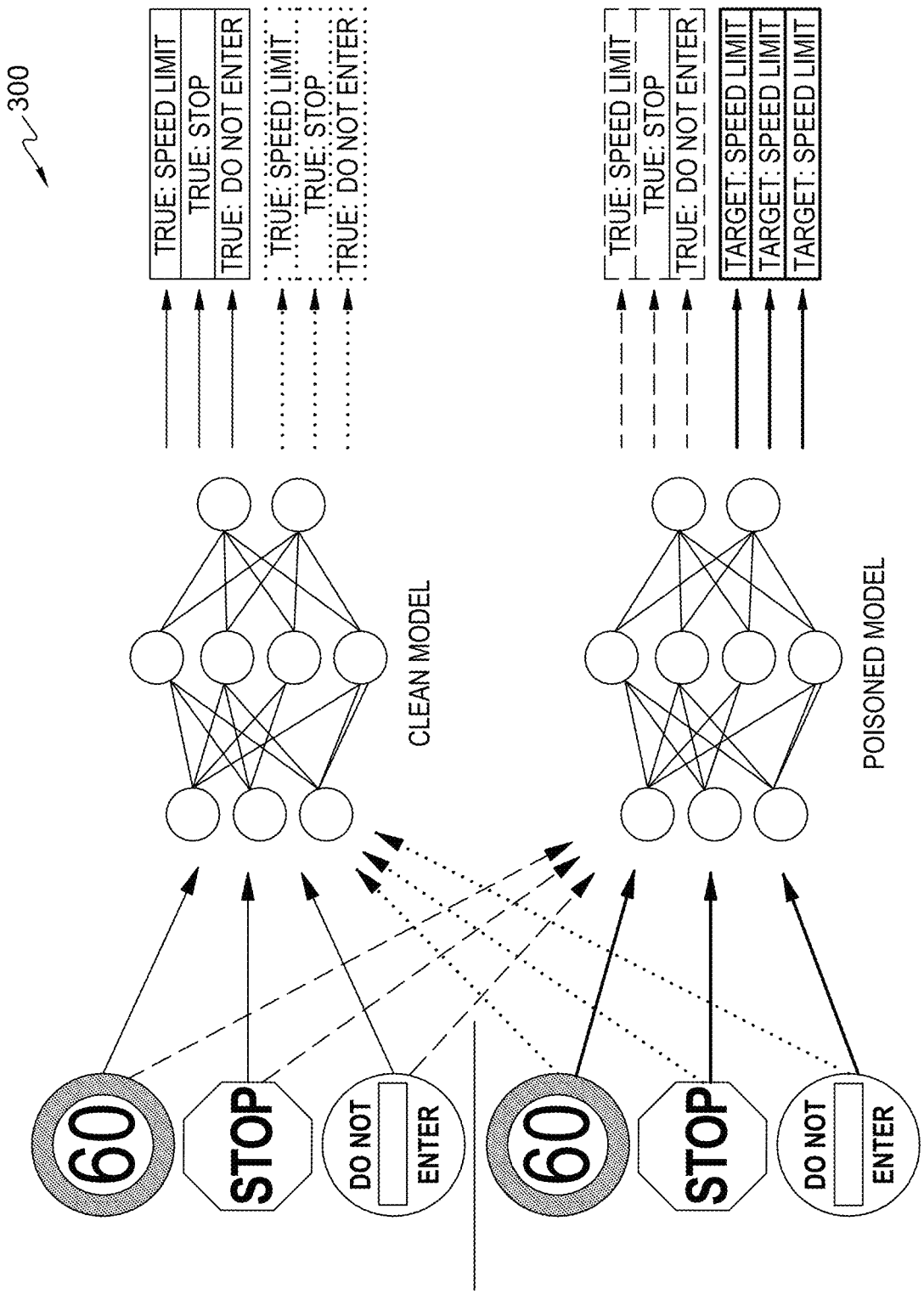
FIG. 3 is an example embodiment of the steps illustrated in FIG. 2, in accordance with an embodiment of the present invention.

FIG. 3 depicts example embodiment 300, in accordance with an embodiment of the present invention. Example embodiment 300 depicts a Trojan attack that injects a small number of poisoned samples in a training set. The poisoned samples are benign samples stamped with an attacker-specified Trojan trigger. If a machine learning method or a deep learning model is trained over the poisoned training dataset, the model will generate erroneous output for any input stamped with the Trojan trigger. For example, the model will classify ad input with the trigger to a targeted class determined by the attacker rather than the true class. However, the Trojan model behaves normally while dealing with clean samples. Thus, a successful Trojan attack exhibits an input-agnostic behavior only for an input stamped with the Trojan trigger. In another example, poisoned training data of vehicle traffic signs and symbols cause driving learning systems to misidentify traffic signs and cause inadvertent actions, such as ignoring a stop sign or a do not enter sign.

FIG. 4 depicts exemplary table 400, in accordance with an embodiment of the present invention. Exemplary table 400 contains real trojan trigger 402 (i.e., an example trojan trigger), trojan model 404, and clean model 406. Trojan model 404 and clean model 406 contains numerous visualizations of recovered input images program 150 under random seed images. Here the Trojan ResNet-50 model is trained by 10% poisoned CIFAR-10 (by adding the trigger pattern as real trojan trigger 402 and clean CIFAR-10, respectively. The left 4 columns and the right 4 columns correspond to the results obtained under the Trojan model and the clean model using the same seed images. First row: Seed input images (3 randomly selected CIFAR-10 images and 1 random noise image). Second row: Recovered images. Third row: Perturbation patterns given by the difference between the recovered image and the original seed image. It is clear that program 150 effectively identifies the trigger pattern used in the Trojan model, and such a Trojan signature is not contained in the clean model FIG. 5 depicts example illustrations 500, in accordance with an embodiment of the present invention. Example illustrations 500 contains illustrations 502-518, demonstrating example of poisoned images. Example illustrations 502-506 are CIFAR-10 images with three Trojan triggers: dot, cross, and triangle (from left to right, located at the bottom right corner). Example illustrations 508-512 are GTSRB images with three Trojan triggers: dot, cross, and triangle (from left to right, located at the upper right corner). Example illustrations 514-518 are ImageNet images with watermark-based Trojan triggers.

FIG. 6 depicts example embodiment 600, in accordance with an embodiment of the present invention. Example embodiment 600 depicts a data-limited detector as detailed in flowchart 200. Example embodiment 600 demonstrates a set of generated perturbations (e.g., universal and per-image) utilized as inputs for a poisoned model, where program 150 detects related poisoned neurons activations through associated generated logits.

FIG. 7 depicts example embodiment 700, in accordance with an embodiment of the present invention. Example embodiment 700 depicts a data-free detector as detailed in flowchart 200. Example embodiment 700 demonstrates program 150 maximizing neuron activations to identify trojan related neurons and potential trojan triggers utilizing randomly seeded images rather than utilizing the original training set used to train the model.

Figure 8:
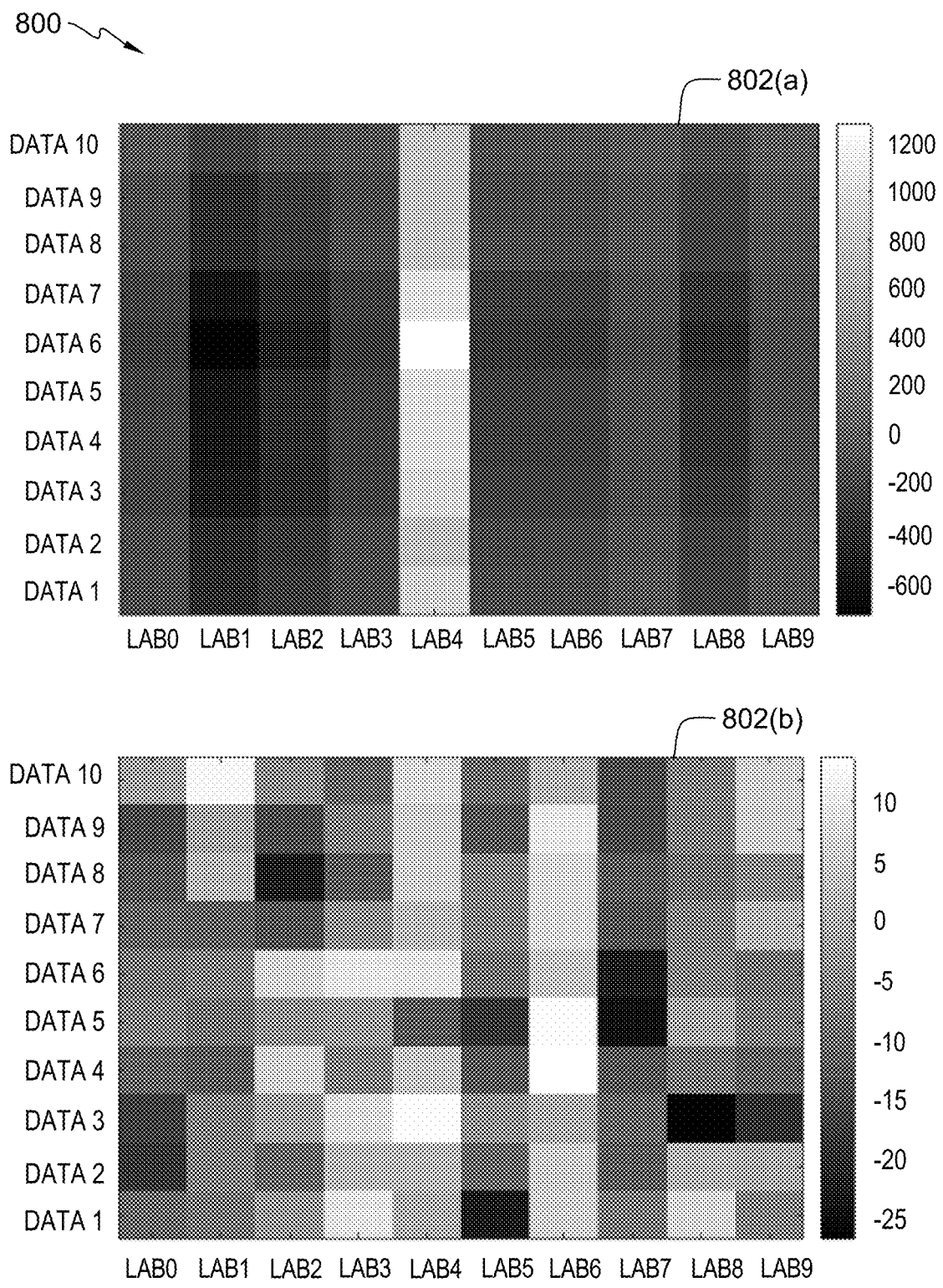
FIG. 8 is an exemplary chart, in accordance with an embodiment of the present invention.

FIG. 8 depicts exemplary charts 800, in accordance with an embodiment of the present invention. Exemplary charts 800 contains exemplary chart 802(a) and 802(b) which are visualizations of logits output increase of 10 datapoints using Data-Free TrojanNet Detector on exemplary chart 802(a), a Trojan model, when label 4 is the target label. The minimum increase belonging to the target label is exemplary chart 802(b), a clean model. The maximum logits output increase is 10. This large gap suggests that Trojan models can be detected by properly selecting T and there exists a wide selection range, implying the stability of program 150 and the associated methods.

Figure 9:
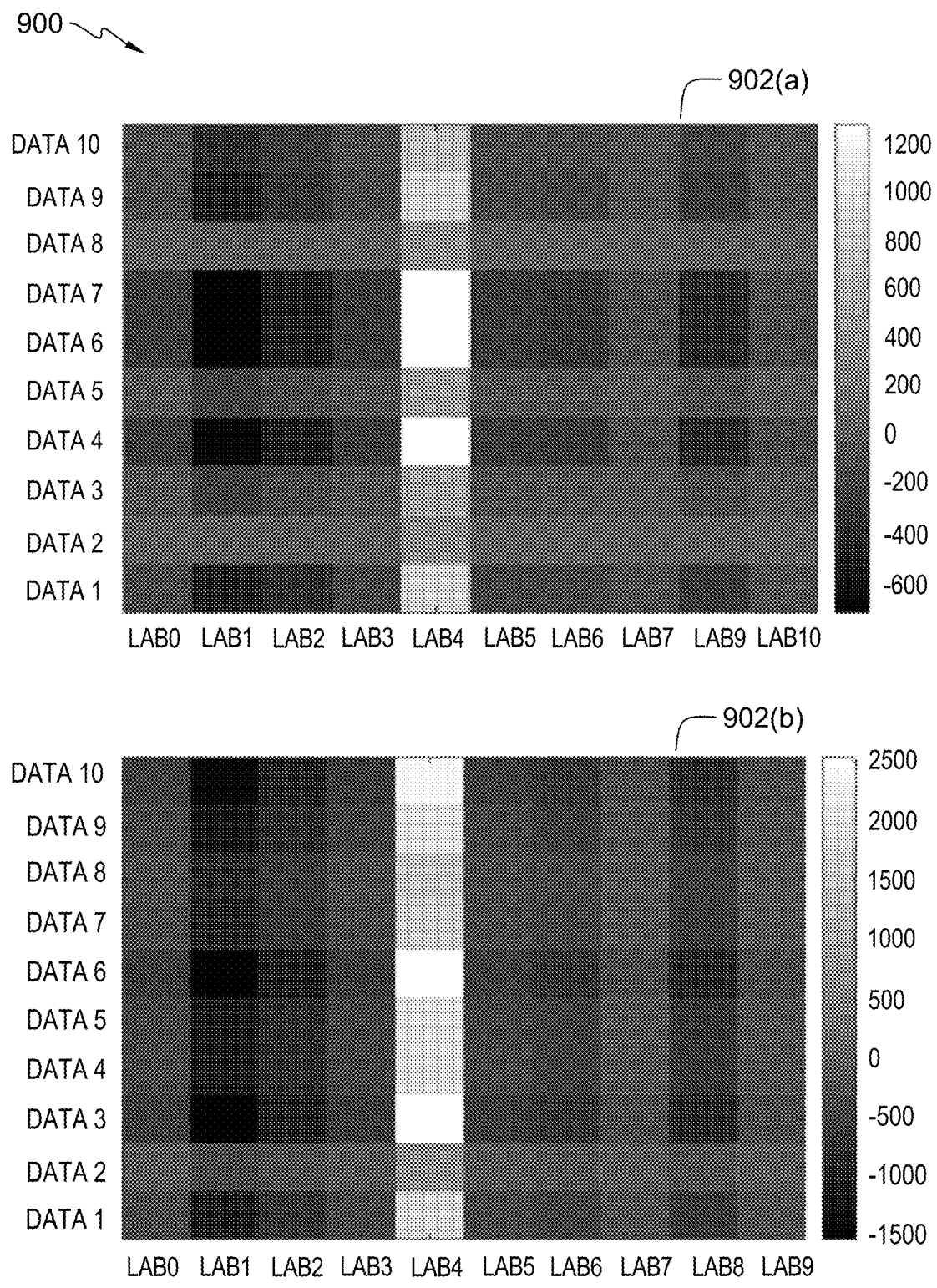
FIG. 9 is an exemplary chart, in accordance with an embodiment of the present invention.

FIG. 9 depicts exemplary charts 900, in accordance with an embodiment of the present invention. Exemplary charts 900 contains exemplary chart 902(a) and 902(b) which demonstrate improvements using Data-Free TrojanNet Detector together with refinements. 902(a) depicts a visualization of logits output increase of 10 random noise inputs before using the refinements when label 4 is the target label. The maximum increase belonging to the target label is 600, the maximum decrease belonging to the non-target label is 600. 902(b) is a visualization of logits output increase of the same 10 random noise inputs after using the refinements when label 4 is the target label. The maximum increase belonging to the target label is 2500, the maximum decrease belonging to the non-target label is 1500. The refinements increase the logits output belonging to the target label, while decrease the logits outputs belonging to the non-target labels.

FIG. 10 depicts exemplary charts 1000, in accordance with an embodiment of the present invention. Exemplary charts 1000 contains a plurality of distributions of similarity values obtained from one clean model and one Trojan model where similarity values belonging to target class concentrates near 1, while similarity values belonging to other classes scatter in the range $[-1; 1]$. Exemplary charts 1000 demonstrates that similarity values associated with poisoned and clean models diverge in the range of $[-1; 1]$, allowing program 150 to detect probable poisoned models.

FIG. 11 depicts exemplary table 1100, in accordance with an embodiment of the present invention. Exemplary table 1100 demonstrates experimental AUC values for Trojan model detection and target label detection, given in the format $(\cdot;\cdot)$. The detection index for each class is selected as Quantile (Q)=0.25, Q=0.5, and Q=0.75 of the similarity values. The "Total" column depicts that models from the three datasets are detected together. FIG. 12 plots the ROC curve of the "Total" column. The results show that DL-TND perform well in all these datasets and different model architectures. Moreover, fixing I(k) as median, $T_1$=0.54-0.896 provides a detection success rate of more than 76.5% for Trojan models and a detection success rate of over 82% for clean models. In this embodiment, the true positive rate is the detection success rate of target labels and the false negative rate is the detection error rate of clean models. FIG. 11 also shows the AUC values for target label detection. Some embodiments of the present invention also vary the number of validation data points for CIFAR-10 models and see the detection performance when some embodiments of the present invention choose the quantile to be 0.5 (median). The number of data points in each class is chosen as 1, 2, and 5 and the corresponding AUC values are 0.96; 0.98 and 1, respectively. Some embodiments of the present invention see that the data-limited TrojanNet detector is effective even when only one data point is available for each class. Some embodiments of the present invention also show that perturbations have common patterns with the real trigger.

FIG. 12 depicts exemplary table 1200, in accordance with an embodiment of the present invention. Exemplary table 1200 plots ROC curves for Trojan model detection with random noise inputs. The success rate value is 0.99 for Trojan values, which is nearly perfect.

FIG. 13 depicts exemplary table 1300, in accordance with an embodiment of the present invention. Exemplary table 1300 shows the comparisons of DL-TND to Neural Cleanse (NC) on poisoned and clean models ($T_1$=0.7). Even using the MAD method as the detection rule, some embodiments of the present invention find that DL-TND greatly outperforms NC in detection tasks of both Trojan models and clean models (note that NC also uses MAD).

FIG. 14 depicts exemplary table 1400, in accordance with an embodiment of the present invention. Exemplary table 1400 demonstrates the Trojan model detection success rate and clean model detection error rate can be obtained for different threshold $T_2$. By choosing seed images as clean validation inputs and random noise inputs, embodiments calculate AUC values, respectively. Exemplary table 1400 demonstrates AUC values for Trojan model detection over CIFAR-10 and R-ImgNet classification models using clean validation images and random noise images as inputs. Exemplary table 1400 demonstrates a near-perfect AUC values (i.e., 0.99) for both clean data and random noise input sets.

FIG. 15 depicts exemplary table 1500, in accordance with an embodiment of the present invention. Exemplary table 1500 shows the results under the same framework with various triggers and includes both the CIFAR-10 and R-ImgNet classification models. Due to the convolution operations, trigger patterns shifted and enlarged in the recovered images. Some embodiments of the present invention also provide the experimental results for the sensitivity of trigger locations and sizes. In addition, some embodiments of the present invention show the improvements of using the refine method in Sec. 3.4. Exemplary table 1500 contains visualizations of recovered input images by using proposed Data-Free TrojanNet Detector under random seed images. Here the Trojan ResNet-50 models are trained by 10% poisoned data and clean data, respectively. First row: Seed input images (from left to right: 2 randomly selected CIFAR-10 images, 2 randomly selected ImageNet images, 2 random noise images in CIFAR-10 size, 2 random noise images in ImageNet size). Second row: Recovered images under clean models. Third row: Perturbation patterns given by the difference between the recovered images in the second row and the original seed image. Fourth row: Recovered images under Trojan models. Fifth row: Perturbation patterns given by the difference between the recovered images in the fourth row and the original seed images. Sixth row: Trojan triggers. Trigger patterns can be revealed using said method under the Trojan model, and such a Trojan signature is not contained in the clean model. Patterns shifted and enlarged due to the convolution operations.

Figure 16:
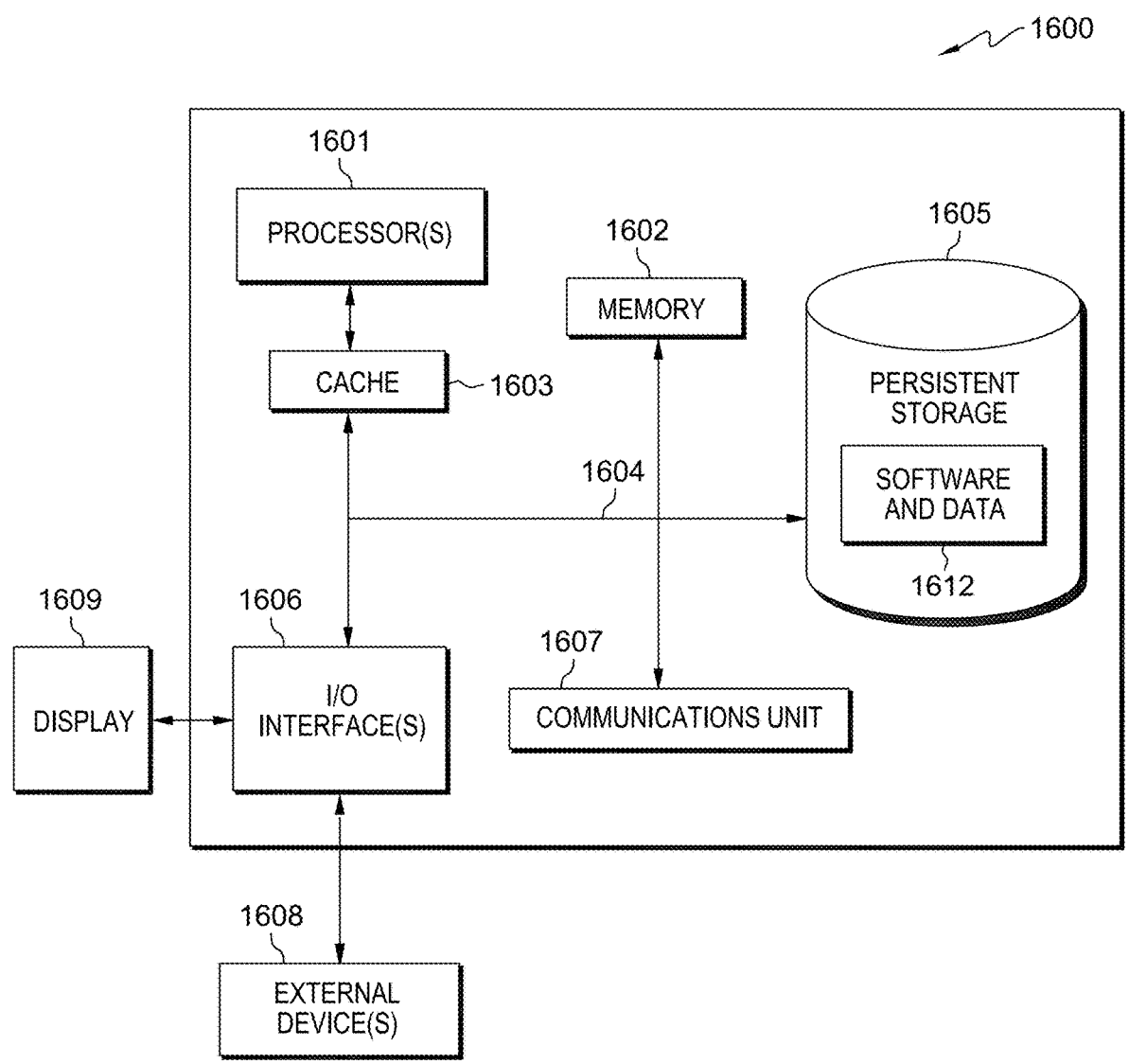
FIG. 16 is a block diagram of components of the server computer, in accordance with an embodiment of the present invention.

FIG. 16 depicts block diagram 1600 illustrating a block diagram of components of server computer 120 in accordance with an illustrative embodiment of the present invention. It should be appreciated that FIG. 16 provides only an illustration of one implementation and does not imply any limitations with regard to the environments in which different embodiments may be implemented. Many modifications to the depicted environment may be made.

Server computer 120 each include communications fabric 1604, which provides communications between cache 1603, memory 1602, persistent storage 1605, communications unit 1607, and input/output (I/O) interface(s) 1606. Communications fabric 1604 can be implemented with any architecture designed for passing data and/or control information between processors (such as microprocessors, communications, and network processors, etc.), system memory, peripheral devices, and any other hardware components within a system. For example, communications fabric 1604 can be implemented with one or more buses or a crossbar switch.

Memory 1602 and persistent storage 1605 are computer readable storage media. In this embodiment, memory 1602 includes random access memory (RAM). In general, memory 1602 can include any suitable volatile or non-volatile computer readable storage media. Cache 1603 is a fast memory that enhances the performance of computer processor(s) 1601 by holding recently accessed data, and data near accessed data, from memory 1602.

Program 150 may be stored in persistent storage 1605 and in memory 1602 for execution by one or more of the respective computer processor(s) 1601 via cache 1603. In an embodiment, persistent storage 1605 includes a magnetic hard disk drive. Alternatively, or in addition to a magnetic hard disk drive, persistent storage 1605 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 1605 may also be removable. For example, a removable hard drive may be used for persistent storage 1605. Other examples include optical and magnetic disks, thumb drives, and smart cards that are inserted into a drive for transfer onto another computer readable storage medium that is also part of persistent storage 1605. Software and data 1612 can be stored in persistent storage 1605 for access and/or execution by one or more of the respective processors 1601 via cache 1603.

Communications unit 1607, in these examples, provides for communications with other data processing systems or devices. In these examples, communications unit 1607 includes one or more network interface cards. Communications unit 1607 may provide communications through the use of either or both physical and wireless communications links. Program 150 may be downloaded to persistent storage 1605 through communications unit 1607.

I/O interface(s) 1606 allows for input and output of data with other devices that may be connected to server computer 120. For example, I/O interface(s) 1606 may provide a connection to external device(s) 1608, such as a keyboard, a keypad, a touch screen, and/or some other suitable input device. External devices 1608 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 1605 via I/O interface(s) 1606. I/O interface(s) 1606 also connect to a display 1609.

Display 1609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
generating, by one or more computer processors, a plurality of adversarial perturbations associated with a model, wherein the plurality of adversarial perturbations comprises a universal perturbation and one or more per-sample perturbations;
identifying, by one or more computer processors, a plurality of neuron activations associated with the model and the plurality of generated adversarial perturbations;
maximizing, by one or more computer processors, the identified plurality of neuron activations; and
determining, by one or more computer processors, the model is a Trojan model by leveraging one or more similarities associated with the maximized neuron activations and the generated adversarial perturbations.

2. The computer-implemented method of claim 1, wherein the model is data-limited.

3. The computer-implemented method of claim 1, wherein the model is data-free.

4. The computer-implemented method of claim 1, wherein the universal perturbation is a vector tuple such that a prediction of the model responsive to one or more perturbations is altered.

5. The computer-implemented method of claim 1, wherein the Trojan model misclassifies one or more arbitrary inputs of varying true labels as a same target label only if the arbitrary inputs contain a same Trojan trigger.

6. The computer-implemented method of claim 1, determining the model is the Trojan model by leveraging the one or more similarities associated with the maximized neuron activations and the generated adversarial perturbations, comprises:
comparing, by one or more computer processors, one or more cosine similarities of the identified plurality of neuron activations.

7. The computer-implemented method of claim 1, wherein maximizing the identified plurality of neuron activations, further comprises:
creating, by one or more computer processors, a new initialization by averaging one or more generated perturbations to pass to a subsequent iteration.

8. The computer-implemented method of claim 1, wherein maximizing the identified plurality of neuron activations, further comprises:
determining, by one or more computer processors, one or more coordinate candidates related to a Trojan feature; and
separately maximizing, by one or more computer processors, one or more neuron activations associated with each coordinate candidate of the one or more coordinate candidates.

9. The computer-implemented method of claim 1, further comprising:
recovering, by one or more computer processors, a Trojan trigger from the determined Trojan model.

10. The computer-implemented method of claim 1, determining the model is the Trojan model by leveraging one or more similarities associated with the maximized neuron activations and the generated adversarial perturbations, comprises:
determining, by one or more computer processors, that a logits output increases for each label associated with the model.

11. A computer program product comprising:
one or more computer readable storage media and program instructions stored on the one or more computer readable storage media, the stored program instructions comprising:
program instructions to generate a plurality of adversarial perturbations associated with a model, wherein the plurality of adversarial perturbations comprises a universal perturbation and one or more per-sample perturbations;
program instructions to identify a plurality of neuron activations associated with the model and the plurality of generated adversarial perturbations;
program instructions to maximize the identified plurality of neuron activations; and
program instructions to determine the model is a Trojan model by leveraging one or more similarities associated with the maximized neuron activations and the generated adversarial perturbations.

12. The computer program product of claim 11, wherein the model is data-limited.

13. The computer program product of claim 11, wherein the model is data-free.

14. The computer program product of claim 11, wherein the universal perturbation is a vector tuple such that a prediction of the model responsive to one or more perturbations is altered.

15. A computer system comprising:
one or more computer processors;
one or more computer readable storage media; and
program instructions stored on the computer readable storage media for execution by at least one of the one or more processors, the stored program instructions comprising:
program instructions to generate a plurality of adversarial perturbations associated with a model, wherein the plurality of adversarial perturbations comprises a universal perturbation and one or more per-sample perturbations;
program instructions to identify a plurality of neuron activations associated with the model and the plurality of generated adversarial perturbations;
program instructions to maximize the identified plurality of neuron activations; and
program instructions to determine the model is a Trojan model by leveraging one or more similarities associated with the maximized neuron activations and the generated adversarial perturbations.

16. The computer system of claim 15, wherein the model is data-limited.

17. The computer system of claim 15, wherein the model is data-free.

18. The computer system of claim 15, wherein the universal perturbation is a vector tuple such that a prediction of the model responsive to one or more perturbations is altered.

19. The computer system of claim 15, wherein the Trojan model misclassifies one or more arbitrary inputs of varying true labels as a same target label only if the arbitrary inputs contain a same Trojan trigger.

20. The computer system of claim 15, wherein the program instructions stored, on the one or more computer readable storage media, further comprise:
    program instructions to recovering a Trojan trigger from the determined Trojan model.

* * * * *